US012592326B2

(12) United States Patent
Richter et al.

(10) Patent No.: US 12,592,326 B2
(45) Date of Patent: Mar. 31, 2026

(54) INSTALLATION AND METHOD FOR PRODUCING ACTIVATED IRRADIATION TARGETS IN AN INSTRUMENTATION TUBE SYSTEM OF A NUCLEAR REACTOR

(71) Applicant: FRAMATOME GmbH, Erlangen (DE)

(72) Inventors: Thomas Fabian Richter, Marloffstein (DE); Alexander Sykora, Nuremberg (DE); Julia Zehnder, Erlangen (DE); Chantal Rosenberger, Burgthann (DE); Wilfried Kanwischer, Hirschaid (DE)

(73) Assignee: FRAMATOME GmbH, Erlangen (DE)

( * ) Notice: Subject to any disclaimer, the term of this patent is extended or adjusted under 35 U.S.C. 154(b) by 611 days.

(21) Appl. No.: 17/926,128

(22) PCT Filed: May 20, 2020

(86) PCT No.: PCT/EP2020/064186
§ 371 (c)(1),
(2) Date: Nov. 17, 2022

(87) PCT Pub. No.: WO2021/233545
PCT Pub. Date: Nov. 25, 2021

(65) Prior Publication Data
US 2023/0187093 A1 Jun. 15, 2023

(51) Int. Cl.
*G21G 1/02* (2006.01)
*G21C 23/00* (2006.01)

(52) U.S. Cl.
CPC ............... *G21G 1/02* (2013.01); *G21C 23/00* (2013.01)

(58) Field of Classification Search
CPC ................................. G21G 1/02; G21C 23/00
See application file for complete search history.

(56) References Cited

U.S. PATENT DOCUMENTS 3,766,005 A * 10/1973 Erkens ................. G21C 17/108 376/245
2013/0170927 A1* 7/2013 Dayal ...................... G21G 1/02 414/222.01

(Continued)

FOREIGN PATENT DOCUMENTS

CA 2653871 A1 8/2009
CN 1167540 A 12/1997

(Continued)

OTHER PUBLICATIONS

Corresponding Search Report and Written Opinion for PCT/EP2020/064186.

*Primary Examiner* — Lily C Garner
(74) *Attorney, Agent, or Firm* — Davidson Kappel LLC

(57) ABSTRACT

A decay station includes a housing comprising a radiation shielding. The housing delimits a decay conduit intended for containing the irradiation targets in the predetermined linear order. The decay conduit includes a decay conduit inlet, intended to be connected to the structure of the core of the nuclear reactor for receiving the irradiation targets therefrom; and a decay conduit outlet, intended to be connected to an irradiation target discharge system for discharging the irradiation targets from the decay station. The decay station further includes an inlet distributor, located at the decay conduit inlet, and configured for releasing only a predetermined amount of irradiation targets at a time from the decay station towards the structure of the core of the nuclear reactor. The inlet distributor is configured for releasing the irradiation targets closest to the decay conduit inlet, while retaining the remaining irradiation targets in the decay conduit. The decay station further includes an inlet counter configured for counting the number of irradiation targets entering or exiting the decay conduit through the decay conduit inlet. The inlet counter is located at the decay (Continued)

conduit inlet. The decay station further includes an outlet radiation detector configured for measuring the radiation emitted by an irradiation target located at the decay conduit outlet.

19 Claims, 7 Drawing Sheets

(56) References Cited

U.S. PATENT DOCUMENTS

| | | | | |
|---|---|---|---|---|
| 2013/0177118 A1* | 7/2013 | Heinold | B65D 21/0233 376/202 |
| 2013/0177126 A1* | 7/2013 | Runkle | G21G 1/02 376/342 |
| 2013/0315361 A1* | 11/2013 | Berger | G21C 19/32 376/202 |
| 2013/0315461 A1* | 11/2013 | Zhao | G01R 33/56366 382/131 |
| 2017/0365370 A1* | 12/2017 | Schuster | H05H 6/00 |
| 2018/0025802 A1* | 1/2018 | Richter | G21G 1/02 376/202 |
| 2018/0025803 A1* | 1/2018 | Richter | G21C 23/00 376/202 |
| 2018/0108445 A1* | 4/2018 | Richter | G21G 1/0005 |
| 2018/0211733 A1* | 7/2018 | Richter | G21C 23/00 |

FOREIGN PATENT DOCUMENTS

| | | | | |
|---|---|---|---|---|
| CN | 107851472 A | 3/2018 | |
| EP | 3167457 A1 | 5/2017 | |
| EP | 3257053 A1 | 12/2017 | |
| EP | 3289591 A1 | 3/2018 | |
| EP | 3326175 A1 | 5/2018 | |
| RU | 2679404 C1 | 2/2019 | |
| RU | 2017130343 A | 2/2019 | |
| WO | WO2016173664 A1 | 11/2016 | |
| WO | WO2019086329 A1 | 5/2019 | |
| WO | WO-2020233814 A1 * | 11/2020 | G21G 1/02 |

* cited by examiner

INSTALLATION AND METHOD FOR PRODUCING ACTIVATED IRRADIATION TARGETS IN AN INSTRUMENTATION TUBE SYSTEM OF A NUCLEAR REACTOR

The present disclosure relates to a decay station configured for receiving irradiated irradiation targets from a structure inside a core of a nuclear reactor, to a diverter for an installation for producing activated irradiation targets in a nuclear reactor, as well as to an installation and method for producing activated irradiation targets in an instrumentation tube system of a nuclear reactor.

BACKGROUND

Radioactive nuclides are used in various fields of technology and science, as well as for medical purposes. These radionuclides are produced in research reactors or cyclotrons. However, since the number of facilities for commercial production of radionuclides is limited already and expected to decrease, it is desired to provide alternative production sites.

The neutron flux density in the core of a commercial nuclear reactor is measured, inter alia, by introducing solid spherical probes into instrumentation tubes passing through the reactor core. It was therefore suggested that instrumentation tubes of commercial nuclear reactors shall be used for producing radionuclides when the reactor is in power generating operation. In particular, one or more instrumentation tubes of an aero-ball measuring system of a commercial nuclear reactor can be used, and existing components of the ball measuring system can be modified and/or supplemented to enable an effective production of radionuclides during reactor operation.

In this context, patent applications EP3326175 A1 or WO 2019/086329 A1 describe installations and methods for producing radionuclides in an instrumentation tube system of a nuclear reactor.

These installations are, however, not entirely satisfactory.

Indeed, the delivery intervals for the radionuclides requested by the clients are generally shorter than the time required for the generation of the radionuclides through exposure to neutron flux in the core of the nuclear reactor. Since only few instrumentation tubes are available for producing the radionuclides, it is not possible, using the radionuclide production installations described above, to reduce the production interval and provide radionuclides with the frequency requested by the clients.

In addition, the activation of the irradiation targets in the core of the nuclear reactor results in the production of the desired radionuclides, but also of short-lived highly radioactive isotopes as by-products. For example, the production of Lutetium-177 in the core of a nuclear reactor results in the generation of a highly radioactive isotope of Ytterbium as a by-product. In addition, highly radioactive isotopes of aluminum are formed as by-products in the case where the irradiation targets comprise an envelope containing aluminum.

Due to their high radioactivity, these by-product isotopes should not be handled by the conventional radionuclide discharge systems described in the above-mentioned patent applications, since this would result in an unacceptably high radiation transmission to the environment, as these discharge systems are designed for the less-radioactive radionuclides which are to be produced by the installation, and not for these by-product isotopes.

One solution for discharging the activated irradiation targets, containing both the desired radionuclide(s) and the short-lived by-products, into conventional storage containers is to add a hot cell for receiving the activated irradiation targets prior to discharging them into the storage containers. However, the construction of such a hot cell is very expensive and the hot cell further occupies a high amount of space, which makes it difficult to provide such a hot cell in the case of commercial nuclear reactors, where the available space is limited.

SUMMARY

Therefore, one purpose of the present disclosure is to provide a system which allows delivering radionuclides with a delivery interval which is shorter than the activation time needed for producing the radionuclides in the core of the nuclear reactor, and which further makes it possible to discharge the activated irradiation targets from a structure of a core of a nuclear reactor in a cost effective and compact manner, while minimizing the risk for the environment.

For this purpose, the present disclosure provides a decay station configured for receiving irradiation targets from a structure of a core of a nuclear reactor in a predetermined linear order, comprising a housing comprising a radiation shielding, configured for shielding the environment of the decay station from the radiation emitted by the irradiation targets contained in the decay station,

- the housing delimiting a decay conduit intended for containing the irradiation targets in the predetermined linear order, the decay conduit comprising:
  - a decay conduit inlet, intended to be connected to the structure of the core of the nuclear reactor for receiving the irradiation targets therefrom;
  - a decay conduit outlet, intended to be connected to an irradiation target discharge system for discharging the irradiation targets from the decay station, the decay station further comprising:
- an inlet distributor, located at the decay conduit inlet, and configured for releasing only a predetermined amount of irradiation targets at a time from the decay station towards the structure of the core of the nuclear reactor, the inlet distributor being configured for releasing the irradiation targets closest to the decay conduit inlet, while retaining the remaining irradiation targets in the decay conduit;
- an inlet counter, configured for counting the number of irradiation targets entering or exiting the decay conduit through the decay conduit inlet, the inlet counter being located at the decay conduit inlet, and
- an outlet radiation detector, configured for measuring the radiation emitted by an irradiation target located at the decay conduit outlet.

The decay station according to the present disclosure allows for a transfer of a specific amount of irradiation targets into the decay station, either for temporary storage of partially activated irradiation targets or for allowing for a decay of the short-lived radioisotopes of the activated irradiation targets to an acceptable level prior to their discharge into storage containers.

The possibility of transferring a specific amount of irradiation targets contained in the decay station back into the core of the nuclear reactor by means of the inlet distributor and associated counter makes it possible to produce batches of radioisotopes with a delivery interval which is shorter than the activation time required for the production of the radioisotopes in the core within one same instrumentation finger. For example, it is possible to produce batches of radioisotopes with a delivery interval corresponding to half the activation time required for the production of the radioisotopes in the core.

In particular, the decay station may receive, in this linear order, from the inlet to the outlet of the decay station, a batch of partly activated irradiation targets, having spent only a fraction of the required activation time in the core and a batch of fully activated irradiation targets, having spent the required activation time in the core. The inlet distributor then allows selectively transferring only the partly activated irradiation targets back into the core, after having introduced a number of non-activated irradiation targets into the core, while retaining the fully activated irradiation targets in the decay station for further decay of the short-lived by-product isotopes, prior to the discharge of the fully activated irradiation targets into storage containers through an adapted discharge system.

This decay station therefore also allows discharging the fully activated irradiation targets into conventional storage containers without need for a hot cell or for manipulators by allowing an intermediate storage of the fully activated irradiation targets within the discharge circuit of the system for a duration sufficient for the activity of the short-lived radioisotopes to decrease to an acceptable level. Once the radioactivity level has decreased below a predetermined threshold, the activated irradiation targets may automatically be transferred out of the decay station and into the discharge system of the installation for producing activated irradiation targets.

The transfer into and out of the decay station may occur automatically, without any manual handling, as would be required, for example, in the case of a hot cell.

In addition, the decay station according to the present disclosure may be integrated directly into existing radionuclide generation installations with little additional effort, while allowing for a safe decay of the short-lived highly radioactive by-product isotopes. In this respect, the decay station may be inserted at any location on the path of the irradiation targets from the core of the nuclear reactor to the discharge system, thus allowing for a high flexibility.

The decay station according to the present disclosure therefore constitutes a cost effective and compact solution for discharging the activated irradiation targets from the core of the nuclear reactor, while minimizing the risk for the environment.

The decay station may further comprise one or more of the following features, taken alone or according to any technically possible combination:

- the decay station further comprises a pressurized gas supply, connected to the decay conduit outlet for introducing pressurized gas into the decay conduit from the outlet thereof;
- the inlet distributor successively comprises, in a direction from the decay conduit inlet toward the decay conduit outlet,
  - a lock element, displaceable between a locking position, in which it blocks movement of the irradiation targets out of the decay conduit through the decay conduit inlet and a release position, in which it allows the predetermined amount of irradiation targets out of the decay conduit through the decay conduit inlet; and
  - a retainer, displaceable between a retracted position, in which it allows passage of the irradiation targets, and an extended position, in which it extends at least partially into the decay conduit, the retainer being configured for abutting against an irradiation target in the extended position so as to block the movement of the irradiation target towards the decay conduit inlet, and the inlet distributor further comprises:
  - a first actuator, configured for displacing the lock element between the locking position and the release position; and
  - a second actuator, configured for displacing the retainer between the extended position and the retracted position, the first and/or second actuator being for example a pneumatic, magnetic or hydraulic actuator;
- the lock element comprises a lock pin, configured to extend radially across the decay conduit in the locking position of the lock element and the retainer comprises a retainer pin configured to extend radially partially into the decay conduit in the extended position of the retainer and a spring element, connected to the retainer pin;
- the decay station further comprises a controller, configured to control the release of the predetermined amount of irradiation targets by the inlet distributor by controlling a release sequence comprising the following succession of steps:
  - displacement of the lock element from the release position into the locking position by means of the first actuator;
  - activation of the pressurized gas supply so as to obtain a flow of pressurized gas through the decay conduit from an outlet end thereof, the flow of pressurized gas being configured for pushing the irradiation targets contained in the decay conduit toward the inlet end thereof until they abut against the lock element positioned in the locking position;
  - displacement of the retainer by means of the second actuator from the retracted position into the extended position, in which the retainer is able to abut against an irradiation target contained in the decay conduit;
  - displacement of the lock element from the locking position into the release position by means of the first actuator such that the predetermined amount of irradiation targets, corresponding to the irradiation targets located downstream of the retainer in the direction of pressurized gas flow are carried out of the decay conduit through the decay conduit inlet, while the remaining irradiation targets are retained in the decay conduit by means of the retainer positioned in the extended position;
- the controller is further adapted for repeating the release sequence a number of times depending on the total amount of irradiation targets that are to be released from the decay station through the decay conduit inlet;
- the predetermined amount of irradiation targets is equal to one irradiation target, the distributor being configured for releasing the irradiation targets one by one from the decay station towards the structure of the core of the nuclear reactor;
- the decay station further comprises at least one intermediate irradiation target counter, configured for counting the number of irradiation targets present in the decay conduit, and located between the inlet counter and the decay conduit outlet of the decay conduit, the at least one intermediate irradiation target counter being for example a temperature sensor, a pressure sensor or a radiation sensor, for example a gamma radiation sensor;

the decay station further comprises at least one intermediate radiation detector, configured for measuring the radiation emitted by the irradiation targets contained in the decay conduit, and located between the outlet radiation detector and the decay conduit inlet;

the decay station comprises one intermediate radiation detector or outlet radiation detector for each irradiation target contained in the decay station;

the decay station further comprises an outlet distributor, located at the decay conduit outlet, and configured for releasing only a predetermined amount of irradiation targets at a time out of the decay station through the outlet of the decay conduit, the outlet distributor being configured for releasing the irradiation targets closest to the decay conduit outlet, while retaining the remaining irradiation targets in the decay conduit.

the decay conduit is a rectilinear conduit, preferably inclined downwards from the decay conduit inlet to the decay conduit outlet;

the decay conduit is substantially U-shaped and comprises a first decay conduit section, a second decay conduit section and a bottom formed at the conjunction between the first and second decay conduit sections, the first and second decay conduit sections extending upwards from the bottom;

the decay station further comprises a controller configured for discharging at least some of the irradiation targets from the decay station after a predetermined decay duration;

the decay station further comprises a controller configured for discharging only the irradiation targets which emit a radiation below a predetermined threshold, the emitted radiation being measured by the outlet radiation detector and/or by the optional intermediate radiation detector;

the decay station further comprises a controller configured for discharging at least some of the irradiation targets when the radiation measured by the outlet radiation detector, and optionally by the intermediate radiation detectors, has decreased below a predetermined threshold;

the structure of the core of the nuclear reactor is an instrumentation tube system of a nuclear reactor.

The present disclosure also relates to a diverter for an installation for producing activated irradiation targets in a nuclear reactor, the diverter having a first configuration, in which it defines a path for the displacement of the irradiation targets between a structure of the core of the nuclear reactor, in particular an instrumentation tube system, and an irradiation target discharge system for discharging the activated irradiation targets, and a second configuration, in which it defines a path for the displacement of the irradiation targets between an irradiation target feed system and the structure of the core of the nuclear reactor, the diverter comprising:

a first connector intended to be connected to the irradiation target discharge system;

a second connector intended to be connected to the irradiation target feed system;

a third connector intended to be connected to the structure of the core of the nuclear reactor;

at least one diverter conduit which is movable between:

a first position, in which it connects one of the first connector and the second connector to the third connector so as to define a path for the irradiation targets from the one of the first and the second connector to the third connector, and a second position, in which it does not connect the one of the first connector and the second connector to the third connector;

the or each diverter conduit being shaped in such a manner that it induces, along its length, two changes of direction of the irradiation targets intended to circulate therein, and an actuator, configured for displacing the or each diverter conduit between its first position and its second position.

This diverter is advantageous, since it is compact, and allows selectively transferring the targets to different destinations directly, i.e. without need for additional intermediate transfer operations.

The diverter may further comprise one or more of the following features, taken alone or according to any technically possible combination:

the or each diverter conduit comprises a substantially straight end section at each end of the diverter conduit and an intermediate section extending there-between;

the intermediate section of each diverter conduit is straight, the absolute value of an angle between the end sections of the diverter conduit and the intermediate section being for example comprised between 2° and 5°;

the intermediate section of the or each diverter conduit is curved, a radius of curvature of the or each diverter conduit at the junction with each of the end sections being for example comprised between 200 and 800 mm;

the third connector is spaced apart from the first connector and the second connector along the horizontal direction;

the first connector and the second connector are substantially aligned along the vertical direction and/or the third connector is located at a height intermediate between the heights of the first and second connectors;

the actuator is configured for displacing the or each diverter conduit between its first position and its second position by translation or rotation;

the diverter further comprises a first diverter conduit and a second diverter conduit, the first diverter conduit connecting the first connector to the third connector in its first position so as to define a path for the displacement of the irradiation targets from the first connector to the third connector, and the second diverter conduit connecting the second connector to the third connector in its first position so as to define a path for the displacement of the irradiation targets from the second connector to the third connector;

the diverter is configured such that the first diverter conduit is in its first position when the second diverter conduit is in its second position and vice versa;

the diverter further comprises a piston, delimiting the first and the second diverter conduits therein, the piston being movable between a first position in which the first diverter conduit is in its first position and the second diverter conduit in its second position and a second position in which the first diverter conduit is in its second position and the second diverter conduit in its first position.

the diverter further comprises a diverter housing, the piston being received in the diverter housing so as to be able to slide therein along a direction of displacement.

the diverter housing further comprises:

- a first and a second chamber formed between the piston and the diverter housing, the first and second chambers being located on either side of the piston along the direction of displacement of the piston;
- an inlet port, in fluid communication with the first chamber and intended for introducing a pressurized fluid into the first chamber so as to displace the piston from its first position into its second position; and
- an outlet port, in fluid communication with the second chamber, and intended for allowing removal of air from the second chamber during displacement of the piston along its direction of displacement;

the piston is configured for returning into its first position in the absence of pressurized fluid in the first chamber;

the diverter housing comprises a first and a second wall, spaced apart from each other along the longitudinal direction of the diverter conduit, the first and second connectors being provided on the first wall and the third connector being provided on the second wall;

the first and second diverter conduits are symmetric relative to a median plane between these two conduits;

the diverter comprises one single diverter conduit, the diverter conduit connecting the first connector to the third connector in the first position thereof, and the second connector to the third connector in the second position thereof, the diverter conduit being rotatable between the first position and the second position;

the diverter further comprises a support, on which the first and second connectors are provided and a rotatable conduit carrier, which is mounted on the support so as to be rotatable relative thereto about an axis of rotation, one end of the diverter conduit being mounted onto the rotatable conduit carrier such that the rotation of the rotatable conduit carrier displaces the diverter conduit between its first position and its second position.

The present disclosure also relates to an installation for producing activated irradiation targets in an instrumentation tube system of a nuclear reactor, comprising:

- an irradiation target feed system configured for providing non-activated irradiation targets;
- an instrumentation tube system, configured for receiving the irradiation targets from the irradiation target feed system in view of their activation through exposure to neutron flux in the nuclear reactor;
- a decay station as defined above, the decay conduit inlet of the decay conduit being connected to the instrumentation tube system and the inlet distributor of the decay station being configured for releasing the predetermined amount of irradiation targets at a time from the decay station towards the instrumentation tube system, the inlet distributor being configured for releasing the irradiation targets closest to the instrumentation tube system, while retaining the remaining irradiation targets in the decay station;
- an irradiation target discharge system comprising a target exit port configured to be coupled to a target storage container, the discharge system comprising an inlet end connected to the decay conduit outlet of the decay station;
- a diverter displaceable between a first position, in which it defines a path for the displacement of the irradiation targets between the irradiation target feed system and the instrumentation tube system, and a second position, in which it defines a path for the displacement of the irradiation targets between the instrumentation tube system and the decay station; and
- an irradiation target drive system, configured for transporting at least some of the irradiation targets through the installation, the irradiation target drive system including the pressurized gas supply of the decay station.

The installation may further comprise a controller configured for controlling the following steps carried out by the installation:

- passing a quantity $q_1$ of non-activated irradiation targets from the irradiation target feed system into the instrumentation tube system using the target drive system;
- exposing this quantity $q_1$ of non-activated irradiation targets to neutron flux in the instrumentation tube system for a predetermined irradiation duration $d_1$ so as to obtain a quantity $q_1$ of partially activated irradiation targets, the predetermined irradiation duration $d_1$ being strictly smaller than the minimum activation time for complete conversion of the precursor material contained in the irradiation targets to a desired radionuclide;
- passing the quantity $q_1$ of partially activated irradiation targets from the instrumentation tube system into the decay station using the target drive system;
- passing a quantity $q_2$ of non-activated irradiation targets from the irradiation target feed system into the instrumentation tube system using the target drive system;
- passing the quantity $q_1$ of partially activated irradiation targets back from the decay station into the instrumentation tube system using the target drive system;
- exposing the quantity $q_1$ of partially activated irradiation targets and the quantity $q_2$ of non-activated irradiation targets to neutron flux in the instrumentation tube system for a predetermined irradiation duration $d_2$, so as to obtain a quantity $q_1$ of partially activated or fully activated irradiation targets and a quantity $q_2$ of partially activated irradiation targets; and
- discharging at least some irradiation targets, and preferably the fully activated irradiation targets, from the decay station into the target storage container.

The diverter may be as described above.

The present disclosure also relates to a method for producing activated irradiation targets in an instrumentation tube system of a nuclear reactor using the installation as described above, the method comprising:

- passing a quantity $q_1$ non-activated irradiation targets into the instrumentation tube system from the irradiation target feed system;
- exposing this quantity $q_1$ of non-activated irradiation targets to neutron flux in the instrumentation tube system for a predetermined irradiation duration $d_1$ so as to obtain a quantity $q_1$ of partially activated irradiation targets, the predetermined irradiation duration $d_1$ being equal to or smaller than the minimum activation time for complete conversion of the precursor material of the irradiation targets to a desired radionuclide; and
- passing the quantity $q_1$ of irradiation targets from the instrumentation tube system into the decay station; and
- discharging at least some irradiation targets from the decay station into the target storage container.

The method may further comprise one or more of the following features, taken alone or according to any technically possible combination:

the method further comprises holding at least some of the irradiation targets in the decay station for a predetermined decay duration prior to discharging the irradiation targets from the decay station into the target storage container;

the predetermined duration $d_1$ is smaller than the minimum activation time for complete conversion of the precursor material of the irradiation targets to a desired radionuclide such that the quantity $q_1$ of irradiation targets obtained at the end of the exposing step and passed into the instrumentation tube system is a quantity $q_1$ of partially activated irradiation targets;

the method further comprises the following steps, between the steps of passing the quantity $q_1$ of partially activated irradiation targets from the instrumentation tube system into the decay station and of discharging at least some irradiation targets from the decay station into the target storage container:

passing a quantity $q_2$ of non-activated irradiation targets into the instrumentation tube system;

passing the quantity $q_1$ of partially activated irradiation targets back from the decay station into the instrumentation tube system;

exposing the quantity $q_1$ of partially activated irradiation targets and the quantity $q_2$ of non-activated irradiation targets to neutron flux in the instrumentation tube system for a predetermined irradiation duration $d_2$, so as to obtain a quantity $q_1$ of partially activated or fully activated irradiation targets and a quantity $q_2$ of partially activated irradiation targets;

the method comprises a step of measuring the radiation, and in particular the dose rate, emitted by the quantity $q_1$ of irradiation targets present in the discharge conduit prior to discharging the irradiation targets from the decay station, the irradiation targets being discharged only if their measured radiation, and in particular dose rate, is below a predetermined threshold.

According to another aspect, the present disclosure further relates to an installation for producing activated irradiation targets in an instrumentation tube system of a nuclear reactor, comprising:

an irradiation target feed system configured for providing non-activated irradiation targets;

an instrumentation tube system, configured for receiving the irradiation targets from the irradiation target feed system in view of their activation through exposure to neutron flux in the nuclear reactor;

an irradiation target discharge system comprising a target exit port configured to be coupled to a target storage container, a diverter as described above, configured to selectively define a path for the displacement of the irradiation targets between the irradiation target feed system and the instrumentation tube system or between the instrumentation tube system and irradiation target discharge system, the first connector being connected to the irradiation target discharge system, the second connector being connected to the irradiation target feed system and the third connector being connected to the instrumentation tube system; and an irradiation target drive system, configured for transporting at least some of the irradiation targets through the installation.

According to a particular aspect, the installation further comprises a decay station, arranged on the path of the irradiation targets between the instrumentation tube system and the irradiation target discharge system, and configured for holding the activated irradiation targets prior to their discharge from the installation through the irradiation target discharge system, the first connector being connected to the irradiation target discharge system through the decay station.

BRIEF SUMMARY OF THE DRAWINGS

The present disclosure will be better understood upon reading the following description, given only by way of example with reference to the appended drawings, in which.

DETAILED DESCRIPTION

The present disclosure contemplates that a commercial nuclear reactor can be used for producing artificial radioisotopes or radionuclides, during reactor operation. In particular, conventional aero-ball measuring systems or other systems comprising tubes, for example instrumentation tubes, extending into and/or through the reactor core of the commercial reactor can be modified and/or supplemented to enable an effective and efficient production of radionuclides, when the reactor is in an energy generating mode.

Some of the guide tubes for example of a commercial aero-ball measuring system or Traversing Incore Probe (TIP) system are used to guide the irradiation targets containing the precursor of the desired radionuclide into an instrumentation tube in the reactor core and to lead the activated irradiation targets out of the reactor core.

Figure 1:
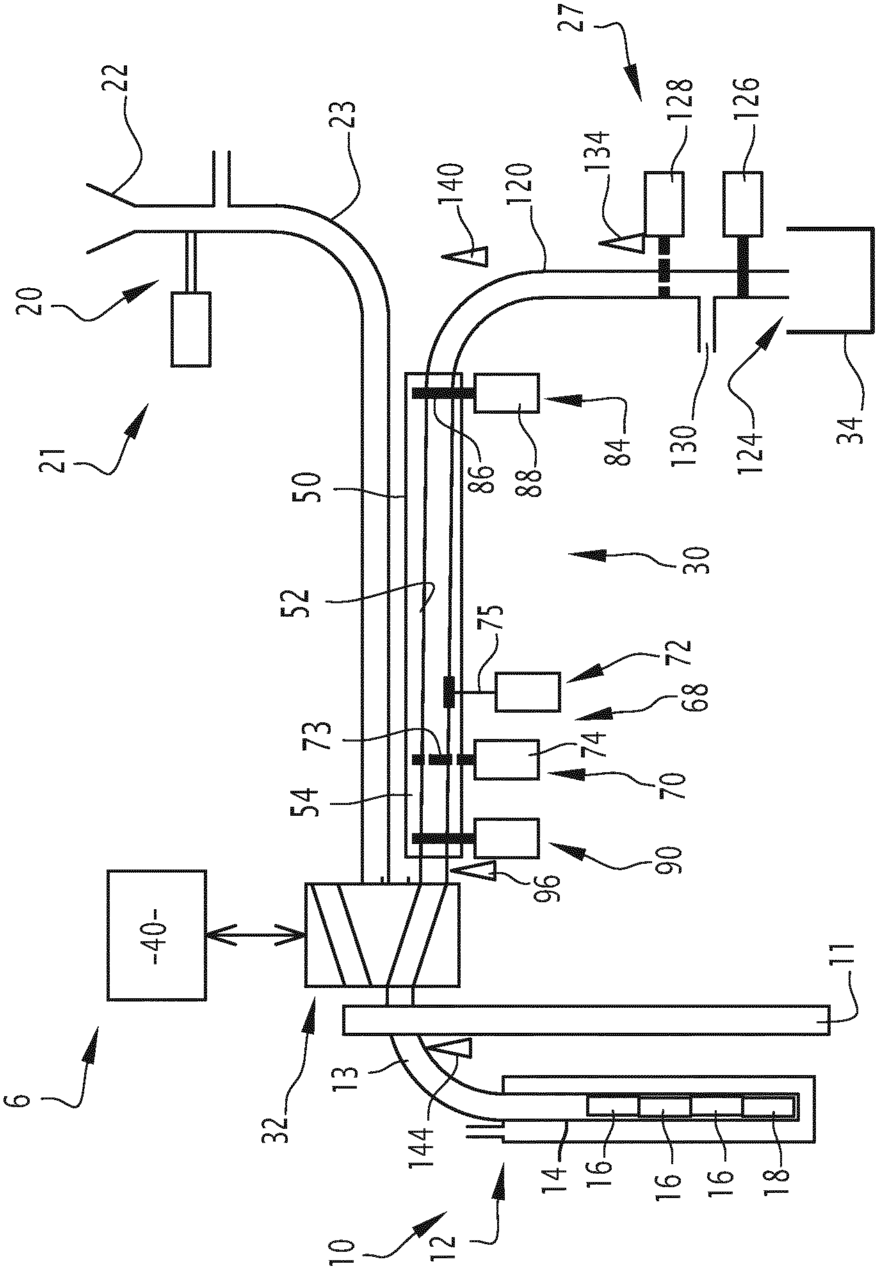
FIG. 1 is a schematic view of an installation for producing activated irradiation targets 16 in a nuclear reactor.

FIG. 1 illustrates an installation 6 for producing activated irradiation targets 16 within a commercial nuclear power plant 8. As opposed to a research reactor, the purpose of a commercial nuclear reactor is the production of electrical power. Commercial nuclear reactors typically have a power rating of 100+ Megawatt electric.

The basis of the installation 6 for producing activated irradiation targets 16 described in the example embodiments is derived from a conventional Aero-ball Measuring System (AMS) used to measure the neutron flux density in the core 10 of the nuclear reactor.

The aero-ball measuring system includes a pneumatically operated drive system configured to insert the aero-balls into an instrumentation finger and to remove the aero-balls from the respective instrumentation finger after activation. Typically, the instrumentation fingers extend into and pass the core 10 through its entire axial length. A plurality of aero-balls are arranged in a linear order in an instrumentation finger, thereby forming an aero-ball column. The aero-balls are substantially spherical or round probes but can have other forms such as ellipsoids or cylinders, as long as they are capable of moving through the conduits of the instrumentation tube system.

Referring to FIG. 1, a commercial nuclear reactor comprises an instrumentation tube system 12 including at least one instrumentation finger 14 passing through the reactor core 10 of the nuclear reactor. The instrumentation tube system 12 is configured to permit insertion and removal of irradiation targets 16 into the instrumentation fingers 14.

The irradiation targets 16 comprise an envelope encapsulating a core made of non-fissile material and comprising a suitable precursor material for generating radionuclides, which are to be used for medical and/or other purposes.

The envelope encapsulates the core in a hermetic manner. It is for example made of a material which is not activated neutron flux, for example of a material comprising polyether ether ketone (PEEK). The envelope may preferably comprise a portion made of a metallic material so as to allow for an improved detection, for example using an inductive sensor.

The core in particular comprises the precursor material in powder form.

More preferably, the irradiation targets 16 consist of the precursor material, which converts to a desired radionuclide upon activating by exposure to neutron flux present in the reactor core 10 of an operating commercial nuclear reactor. Useful precursor materials are Mo-98, Yb-176 and Lu-176, which are converted to Mo-99 and Lu-177, respectively. It is understood, however, that the present disclosure is not limited to the use of a specific precursor material.

Conduits 13 of the instrumentation tube system 12 penetrate an access barrier 11 of the reactor and are coupled to one or more instrumentation fingers 14. Preferably, the instrumentation fingers 14 penetrate the pressure vessel cover of the nuclear reactor, with the instrumentation fingers 14 extending from the top to the bottom over substantially the entire axial length of the reactor core 10. A respective lower end of the instrumentation fingers 14 at the bottom of the reactor core 10 is closed and/or provided with a stop so that the irradiation targets 16 inserted into the instrumentation finger 14 form a column wherein each target 16 is at a predefined axial position.

The activation of the targets 16 is preferably optimized by positioning the irradiation targets 16 in predetermined areas of the reactor core having a neutron flux sufficient for converting a parent material in the irradiation targets 16 completely into the desired radionuclide.

The proper positioning of the irradiation targets 16 may be achieved by means of dummy targets 18 made of an inert material, preferably a magnetic material, and sequencing the dummy targets 18 and the irradiation targets 16 in the instrumentation tube system 12 so as to form a column of the targets 16, 18 within the instrumentation finger 14. In fact, the irradiation targets 16 are at pre-calculated optimum axial positions in the reactor core 10 and the other positions are occupied by the inert dummy targets 18 or remain empty. However, it is preferred to use as many positions within the instrumentation fingers 14 for irradiation targets 16 instead of dummy targets 18 to produce as many radionuclides as possible.

The optional dummy targets 18 are made of an inert material, which is not substantially activated under the conditions in the reactor core 10 of an operating nuclear reactor. Preferably, the dummy targets 18 can be made of inexpensive inert materials and can be re-used after a short decay time so that the amount of radioactive waste is further reduced. More preferably, the dummy targets are magnetic.

The installation 6 is adapted to handle irradiation targets 16 and dummy targets 18 having a round, cylindrical, elliptical or spherical shape and having a diameter corresponding to the clearance of the instrumentation finger 14 of the aero ball measuring system.

The targets 16, 18 preferably a round shape, preferably a spherical or cylindrical shape, so that the targets 16, 18 may slide smoothly through and can be easily guided in the instrumentation tube system 12 by pressurized gas, such as air or nitrogen, and/or under the action of gravity.

Preferably, the diameter of the targets 16, 18 is in the range of between 1 to 3 mm, preferably about 1.7 mm.

According to a preferred embodiment, the commercial nuclear reactor is a pressurized water reactor. More preferably, the instrumentation tube system 12 is derived from a conventional aero-ball measuring system of a pressurized water reactor (PWR) such as an EPR™ or Siemens™ PWR nuclear reactor.

The person skilled in the art will however recognize that the present disclosure is not limited to use of an aero-ball measuring system of a PWR reactor. Rather, it is also possible to use the instrumentation tubes of the Traversing Incore Probe (TIP) system of a boiling water reactor (BWR), the view ports of a CANDU reactor and temperature measurement and/or neutron flux channels in a heavy water reactor.

As shown in FIG. 1, the installation 6 comprises an irradiation target feed system 21 configured for providing non-activated irradiation targets 16 to the instrumentation tube system 12.

The irradiation target feed system 21 comprises a feed tube 23 comprising an outlet end intended to be connected to the instrumentation tube system 12. The irradiation target feed system 21 further comprises a supply unit 22 configured for supplying irradiation targets 16, and optionally dummy targets 18 to the installation 6. The supply unit 22 is configured to be connected to an inlet end of the feed tube 23. The supply unit 22 for example comprises a container, a funnel or a cartridge containing non-activated irradiation targets 16 and/or dummy targets 18.

In the example shown in FIG. 1, the irradiation target feed system 21 further comprises a stopper 20 configured for blocking movement of the irradiation targets 16 and optional dummy targets 18 through the feed tube 23. This stopper 20 may be a magnetically or pneumatically operated pin.

The irradiation targets 16 provided by the irradiation target feed system 21 are non-activated irradiation targets 16, i.e. irradiation targets 16 which have not been subjected to any irradiation in the core 10 of the nuclear reactor, and which do not contain any radioactive isotopes.

Figure 2:
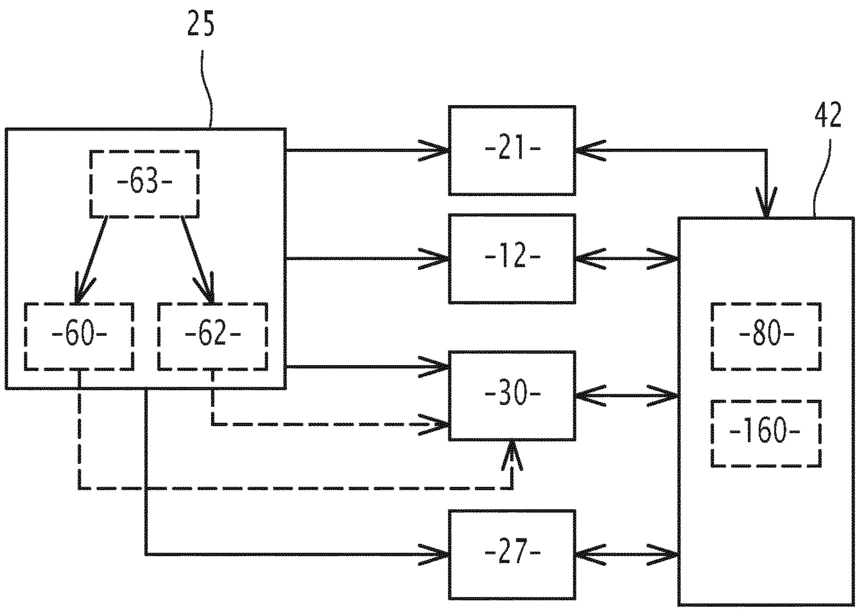
FIG. 2 is another schematic view of the installation for producing activated irradiation targets in a nuclear reactor of FIG. 1.

As shown in FIG. 2, the installation 6 further comprises a target drive system 25 configured to transport the irradiation targets 16 and optional dummy targets 18 through the installation 6.

The target drive system 25 is in particular configured to drive the targets 16, 18 from the feed system 21 into the instrumentation fingers 14 in a predetermined linear order and to force the irradiation targets 16 and dummy targets 18 out of the instrumentation finger 14 thereby retaining the linear order of the targets 16, 18.

Preferably, the target drive system 25 is pneumatically operated using pressurized gas such as nitrogen or air. Such a system allows for a fast processing of the irradiation targets 16 and optionally the dummy targets 18.

More preferably, the target drive system 25 comprises one or more pneumatically operated valve batteries (not shown) for separate control of the insertion and transport of the irradiation targets 16 and optionally dummy targets 18 in the instrumentation tube system 12. The valve batteries of the target drive system 25 may be implemented as a further subsystem in addition to the valve batteries of the conventional aero-ball measuring system, or a separate target drive system 25 is installed.

Within the feed system 21, the transfer of the irradiation targets 16 and optional dummy targets 18 from the supply unit 22 into the feed tube 23 may occur under the effect of gravity or may be driven by the target drive system 25.

The installation 6 further comprises an irradiation target discharge system 27 configured to receive irradiation targets 16 from the instrumentation tube system 12 and to discharge these irradiation targets 16 into a shielded storage container 34. The irradiation target discharge system 27 will be described in greater detail below, with reference to FIG. 1.

The installation 6 according to the present disclosure additionally comprises a decay station 30, connected between the instrumentation tube system 12 and the irradiation target discharge system 27.

The decay station 30 is configured for receiving partially or fully activated irradiation targets 16 from a structure of a core of a nuclear reactor, and in particular driven out of the instrumentation tube system 12.

The decay station 30 is in particular intended for holding fully activated irradiation targets 16 for a predetermined time so as to allow for a predetermined decay of the activity of these fully activated irradiation targets 16 prior to discharging these irradiation targets 16 into the storage container 34 by means of the irradiation target discharge system 27.

Preferably, the decay station 30 is located outside the reactor core 10, but preferably within accessible areas inside the reactor containment. The decay station 30 will be described in more detail below with reference to FIGS. 1 and 3.

In the embodiment shown in FIG. 1, the installation 6 additionally comprises a diverter 32 configured for alternatively creating a path for the displacement of the irradiation targets 16 and optional dummy targets 18, between the irradiation target feed system 21 and the instrumentation tube system 12 or between the instrumentation tube system 12 and the decay station 30. More particularly, the diverter 32 has a first configuration, in which it defines a path for the displacement of the irradiation targets 16 and optional dummy targets 18 from the instrumentation tube system 12 to the decay station 30 and a second configuration, in which it defines a path for the displacement of the irradiation targets 16 and optional dummy targets 18 from the irradiation target feed system 21 to the instrumentation tube system 12.

The displacement of the irradiation targets 16 and optional dummy targets through the diverter 32 is driven by the target drive system 25.

The installation 6 further comprises a switching unit 40, configured for placing the diverter 32 into the first configuration or the second configuration depending on the needs.

The diverter 32 will be described in more detail below with reference to FIGS. 5 and 6.

With reference to FIG. 2, the installation 6 further comprises an instrumentation and control unit (ICU) 42 connected to the irradiation target feed system 21, the instrumentation tube system 12, the target drive system 25, the switching unit 40, the decay station 30 and the irradiation target discharge system 27.

Preferably, the ICU 42 is also connected to a fault monitoring system 28 of the aero-ball measuring system for reporting any errors. The fault monitoring system 28 may also be designed without connection to the existing aero-ball measuring system, but be connected directly to a main control room.

In addition, the installation 6 comprises an online core monitoring system 26 for controlling activation of the irradiation targets 16.

According to an embodiment, the core monitoring system 26 and the instrumentation and control unit 24 are configured such that the activation process for converting the irradiation targets 16 to the desired radionuclide is optimized by considering the actual state of the reactor, especially the current neutron flux, fuel burn-up, reactor power and/or loading. Thus, an optimum axial irradiation position and irradiation time can be calculated for optimum results. It is however not important whether the actual calculation is performed in the ICU 42 or by the core monitoring system 26 of the aero-ball measuring system.

The decay station 30 according to the first embodiment will now be described in more detail with reference to FIG. 3.

The decay station 30 according to the first embodiment is preferably configured for receiving cylindrical irradiation targets 16, preferably having a circular basis. As described above, the irradiation targets 16 preferably have a diameter comprised between 1 mm and 3 mm, and preferably equal to about 1.7 mm.

The length of each cylindrical irradiation target 16 is preferably greater than or equal to twice the diameter of the irradiation targets 16. The upper limit of the length of the cylindrical irradiation targets 16 is in particular defined by the radius of curvature of the conduits of the installation 6. The length of each cylindrical irradiation target 16 is for example comprised between 60 mm and 75 mm, and more particularly equal to about 70 mm.

The decay station 30 comprises a housing 50 delimiting a decay conduit 52 intended for containing irradiation targets 16, and more particularly partially or fully activated irradiation targets.

The linear order of the irradiation targets 16 in the instrumentation tube system 12 is retained in the decay station 30.

The installation 6 may comprise a separating device 53 (shown in FIG. 3) located along the path of the targets 16, 18 from the instrumentation tube system 12 to the decay station 30 for removing the optional dummy targets 18 such that only irradiation targets 16 are transferred into the decay station 30. Preferably, the dummy targets 18 are magnetic and the irradiation targets 16 are non-magnetic, and the separating device 53 comprises an optional magnetic device, for example comprising an electromagnet, arranged along the path of the targets 16, 18 from the instrumentation tube system 12 to the decay station 30 and configured for retaining only the dummy targets 18. In this respect, when present, the dummy targets 18 are generally arranged below the irradiation targets 16 in the instrumentation finger 14 such that the irradiation targets 16 are located in front of the dummy targets 18 when the targets 16, 18 are driven from the instrumentation tube system 12 towards the decay station 30. The dummy targets 18 and the separating device 53 are optional.

The decay conduit 52 preferably has a circular cross-section. The inner diameter of the decay conduit 52 substantially corresponds to the outer diameter of the irradiation targets 16.

The housing 50 comprises a radiation shielding 54, configured for shielding the environment of the decay station 30 from the radiation emitted by the partially or fully activated irradiation targets 16 contained in the decay station 30, and in particular for limiting the amount of radiation radiating from the inside of the decay station 30 into the environment thereof.

The radiation shielding 54 is made of a material adapted for absorbing or reflecting radiation, and in particular alpha, gamma and/or beta radiation. According to one example, the radiation shielding 54 is made of lead or tungsten or combinations thereof.

The thickness of the radiation shielding 54 is chosen in particular depending on the nature of the radionuclides that are to be received in the decay station 30, and in particular depending on the amount of radiation emitted. Preferably, the thickness of the radiation shielding 54 is chosen so as to be able to obtain a dose in the environment outside of the decay station 30 smaller than or equal to a predetermined threshold. The predetermined threshold is for example equal to 25 μSv/h at a distance of 50 cm from the decay station 30.

The radiation shielding 54 preferably extends over the entire circumferential outer surface of the housing 50. In particular, the radiation shielding 54 forms the wall of the housing 50 delimiting the decay conduit 52.

The decay conduit 52 comprises:

- a decay conduit inlet 56, intended to be connected to the instrumentation tube system 12 for receiving the irradiation targets 16 therefrom;
- a decay conduit outlet 58, intended to be connected to the irradiation target discharge system 27 for discharging the irradiation targets 16 from the decay station 30.

The decay conduit inlet 56 forms the inlet of the decay station 30, while the decay conduit outlet 58 forms the outlet of the decay station 30.

The decay conduit inlet 56 is more particularly intended to be connected to the instrumentation tube system 12 in the first configuration of the diverter 32.

Preferably, the length of the decay conduit 52 between the inlet 56 and the outlet 58 thereof is equal to or greater than the length of the activation zone of the instrumentation tube system 12 such that all the irradiation targets 16 activated in the instrumentation tube system 12 fit into the decay conduit 52. The activation zone corresponds to the zone of the instrumentation tube system 12 intended to receive the irradiation targets 16 for their activation in the core. In particular, the length of the decay conduit 52 between the inlet 56 and the outlet 58 thereof is greater than or equal to the length of the instrumentation finger 14.

Figure 3:
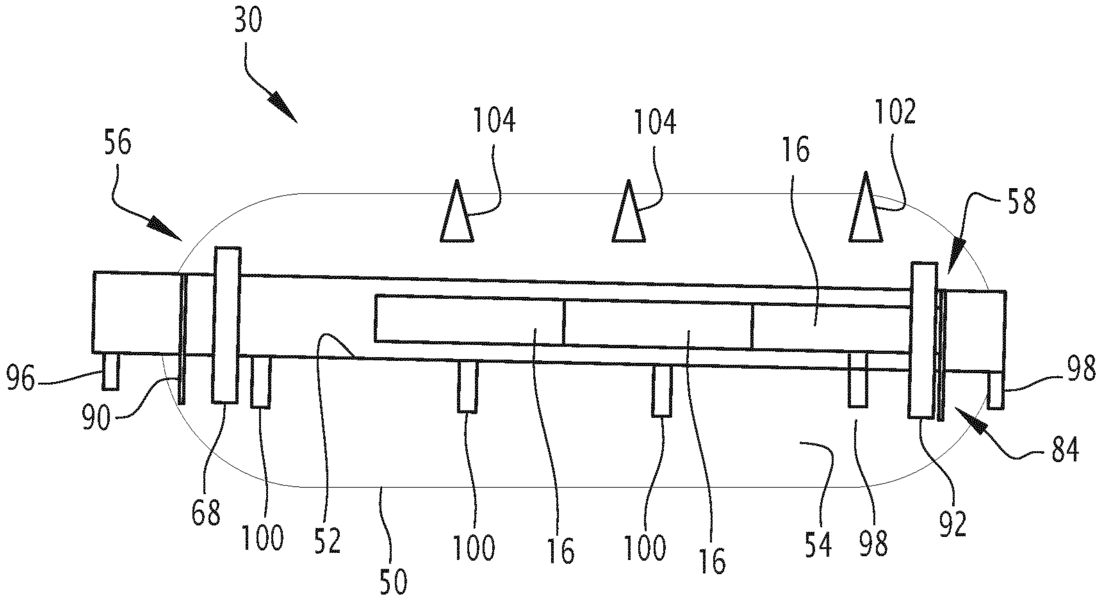
FIG. 3 is a schematic view of a decay station of the installation of FIG. 1 according to a first embodiment.

In the first embodiment, shown in FIG. 3, the decay conduit 52 extends in a rectilinear manner from the decay conduit inlet 56 to the decay conduit outlet 58.

As shown in FIG. 3, the decay conduit 52 is preferably inclined downwards from the decay conduit inlet 56 to the decay conduit outlet 58. This inclination prevents the irradiation targets 16 from moving towards the decay conduit inlet 56 in the absence of an additional force directed towards the decay conduit inlet 56.

According to an alternative (not shown), the decay conduit 52 extends substantially horizontally.

The housing 50 is for example substantially cylindrical.

The decay station 30 additionally comprises:

- a first pressurized gas supply 60, connected to the decay conduit outlet 58 for introducing pressurized gas into the decay conduit 52 from the outlet 58 thereof; and
- a second pressurized gas supply 62, connected to the decay conduit inlet 56 for introducing pressurized gas into the decay conduit 52 from the inlet 56 thereof.

The first and second pressurized gas supplies 60, 62 are shown only schematically in FIG. 2.

The first and second pressurized gas supplies 60, 62 are in particular part of the irradiation target drive system 25. For example, the first and second pressurized gas supplies 60, 62 are connected to a common pressurized gas supply source 63 of the irradiation target drive system 25.

As shown in FIG. 1, the decay station 30 additionally comprises an inlet distributor 68, located at the decay conduit inlet 56, and configured for releasing only a predetermined amount of irradiation targets 16 at a time from the decay station 30 towards the instrumentation tube system 12, while retaining at least some irradiation targets 16, and in particular the remaining number of irradiation targets 16, in the decay station 30. The inlet distributor 68 is configured for releasing the irradiation targets 16 closest to the decay conduit inlet 56.

The inlet distributor 68 is configured for clamping an irradiation target 16 in the decay conduit 52 so as to retain it against a flow of pressurized gas circulating through the decay conduit 52.

The predetermined amount of irradiation targets 16 is smaller than the total number of irradiation targets 16 that may be received in the decay station 30.

The inlet distributor 68 is preferably configured for releasing only the predetermined amount of irradiation targets 16 at a time from the decay station 30 towards the instrumentation tube system 12 and to retain at least some irradiation targets 16, and in particular the remaining number of irradiation targets 16, in the decay station 30, regardless of the magnetic properties of the irradiation targets 16, and in particular through mechanical operation.

More particularly, the inlet distributor 68 successively comprises, in a direction from the decay conduit inlet 56 toward the decay conduit outlet 58:

- a lock element 70, displaceable between a locking position, in which it blocks movement of the irradiation targets 16 out of the decay conduit 52 through the decay conduit inlet 56 and a release position, in which it allows the predetermined amount of irradiation targets 16 out of the decay conduit 52 through the decay conduit inlet 56;
- a retainer 72, displaceable between a retracted position, in which it allows passage of the irradiation targets 16, and an extended position, in which it extends at least partially into the decay conduit 52 so as to abut against an irradiation target 16 and block the movement of this irradiation target 16 towards the decay conduit inlet 56.

The inlet distributor 68 further comprises:

- a first actuator 74, configured for displacing the lock element 70 between the locking position and the release position; and
- a second actuator 76, configured for displacing the retainer 72 between the extended position and the retracted position.

The lock element 70 and the retainer 72 are configured for allowing gas flow there-through in the locking, respectively extended, positions thereof.

The lock element 70 for example comprises a lock pin 73, configured to extend radially across the decay conduit 52 in the locking position so as to block the passage of the irradiation targets 16. More particularly, the lock pin comprises an actuation end, connected to the first actuator 74 and a free end, opposite the actuation end. In the extended position, the free end of the lock pin 73 abuts against an inner surface of the decay conduit 52. In the extended position, the lock pin 73 extends from one side of the decay conduit 52 to an opposite side thereof, along a diameter of the decay conduit 52. In particular, the length of the lock pin 73 is greater than or equal to the diameter of the decay conduit 52.

In the release position, the lock element 70 is preferably retracted into the housing 50, and does not protrude into the decay conduit 52.

The first actuator 74 is for example a pneumatic, magnetic or hydraulic actuator.

In the extended position, the retainer 72 clamps the irradiation targets 16 against which it abuts against the inner wall of the decay conduit 52. The retainer 72 is configured for exerting a force, in particular a radial force, onto the irradiation target 16 against which it abuts in the extended position which is sufficient for retaining this irradiation target 16 against the force exerted by the flow of pressurized gas flowing through the decay conduit 52.

The second actuator 76 is for example a pneumatic, magnetic or hydraulic actuator.

The retainer 72 for example comprises a retainer pin 75 configured to extend radially into the decay conduit 52 in the extended position and a spring element (not shown), connected to the retainer pin 75. The spring element reduces the risk of damaging the irradiation target 16 against which the retainer pin 75 abuts when the retainer 72 moves into its extended position. According to a particular example, the second actuator 76 is configured for carrying out a linear movement, which is transmitted to the spring, whose force acts on the irradiation target 16. The second actuator 76 further comprises a stop, which limits the range of the linear movement of the second actuator 76 to a predetermined range. The force exerted on the irradiation target 16 by the retainer pin 75 is therefore limited by the stiffness of the spring, as well as by the predetermined movement range of the second actuator 76. It is in particular independent of the force exerted by the second actuator 76.

The distance between the lock element 70 and the retainer 72 is chosen in such a manner that only the predetermined amount of irradiation targets 16 may be accommodated between the lock element 70 and the retainer 72. More particularly, the distance between the lock element 70 and the retainer 72 is strictly greater than the cumulated length of the predetermined amount of irradiation targets 16 and strictly smaller than the cumulated length of predetermined amount of irradiation targets 16 increased by one irradiation target 16. In this case, when the lock element 70 is in its locking position and the retainer 72 is in its extended position, the predetermined amount of irradiation targets 16 may be accommodated in the portion of the decay conduit 52 located between the lock element 70 and the retainer 72, and the retainer 72 abuts against the irradiation target 16 located immediately next to the irradiation target 16 of the predetermined amount of irradiation targets 16 located farthest away from the decay conduit inlet 56.

According to a preferred embodiment, the predetermined amount of irradiation targets 16 distributed by the inlet distributor 68 is equal to one. In this case, the inlet distributor 68 is configured for releasing the irradiation targets 16 one by one from the decay station 30 towards the instrumentation tube system 12. In addition, the distance between the lock element 70 and the retainer 72 is preferably chosen in such a manner that only one irradiation target 16 may be accommodated between the lock element 70 and the retainer 72. More particularly, the distance between the lock element 70 and the retainer 72 is strictly greater than the length of one irradiation target 16 and strictly smaller than the length of two irradiation targets 16. In this case, when the lock element 70 is in its locking position and the retainer 72 is in its extended position, only one irradiation target 16 may be accommodated in the portion of the decay conduit 52 located between the lock element 70 and the retainer 72, and the retainer 72 abuts against the irradiation target 16 immediately adjacent to this irradiation target 16. For example, the distance between the lock element 70 and the retainer 72 is equal to about 1.5 times the length of the irradiation target 16.

The decay station 30 further comprises a controller 80 (see FIG. 2), configured to control the release of the predetermined amount of irradiation targets 16 by the inlet distributor 68 by controlling a release sequence comprising the following succession of steps:

- displacement of the lock element 70 from the release position into the locking position by means of the first actuator 74;
- activation of the first pressurized gas supply 60 so as to obtain a flow of pressurized gas through the decay conduit 52 from an outlet end thereof, the flow of pressurized gas being configured for pushing the irradiation targets 16 contained in the decay conduit 52 toward the inlet end thereof until they abut against the lock element 70 positioned in the locking position;
- displacement of the retainer 72 by means of the second actuator 76 from the retracted position into the extended position, in which the retainer 72 is able to abut against an irradiation target 16 facing the retainer 72 in the decay conduit 52;
- displacement of the lock element 72 from the locking position into the release position by means of the first actuator 74 such that the predetermined amount of irradiation targets 16, corresponding to the irradiation targets 16 located downstream of the retainer 72 in the direction of pressurized gas flow are carried out of the decay conduit 52 through the decay conduit inlet 56 by the flow of pressurized gas, while the irradiation targets 16 located at or upstream of the retainer 72 are retained in the decay conduit 52 by means of the retainer 72 positioned in the extended position.

The above release sequence results in the release of only the predetermined amount of irradiation targets 16 from the decay station 30 through the decay conduit inlet 56, while the remaining irradiation targets 16 are retained in the decay station 30.

According to a particular example, the controller 80 is configured for repeating the release sequence a number of times depending on the total amount of irradiation targets 16 that are to be released from the decay station 30 through the decay conduit inlet 56.

For example, in the preferred example where the predetermined amount of irradiation targets 16 is equal to one, if a number of irradiation targets 16 equal to N is to be released from the decay station 30 through the inlet distributor 68, the controller 80 is configured for repeating the above sequence of steps N times, where N is different from one.

The controller 80 may in particular be part of the ICU 42 described above.

For introducing the irradiation targets 16 into the decay station 30 from the instrumentation tube system 12, the lock element 70 and the retainer 72 are positioned in their release, respectively retracted positions.

The decay station 30 further comprises an inlet counter 96, located at the decay conduit inlet 56, and configured for counting the number of irradiation targets 16 passing by the inlet counter 96. The inlet counter 96 is thus configured for counting the number of irradiation targets 16 entering or exiting the decay conduit 52 through the decay conduit inlet 56.

The inlet counter 96 is a device capable of detecting the passage of an irradiation target 16 in front of the inlet counter 96. It is in particular chosen among an inductive sensor, capable of measuring the change of the inductive or dielectric field of a passing irradiation target 16, a pressure sensor, capable of measuring a pressure difference occurring at the passage of an irradiation target 16, an optical sensor, capable of optically detecting the passage of an irradiation target 16, for example a laser sensor or a contrast sensor, a dielectric sensor or a radiation sensor, capable of detecting a difference in radiation intensity occurring at the passage of an irradiation target 16.

The number of irradiation targets 16 counted by the inlet counter 96 is preferably compared to a preset value so as to ensure that the desired number of irradiation targets 16 have entered or exited the decay station 30 through the decay conduit inlet 56.

In the embodiment shown in FIGS. 1 to 3, the decay station 30 further comprises an outlet stopper 84, located at an outlet end thereof, and configured for blocking movement of the irradiation targets 16 out of the decay station 30 through the decay conduit outlet 58. The outlet stopper 84 contributes to ensuring that the irradiation targets 16 contained in the decay conduit 52 remain in a predetermined position within the decay conduit 52 in the absence of a force directed toward the decay conduit inlet 56 exerted on the irradiation targets 16, in particular in the absence of a flow of pressurized gas in the direction from the decay conduit outlet 58 toward the decay conduit inlet 56.

In the first embodiment, in which the decay conduit 52 is inclined downwards from its inlet 56 toward its outlet 58, the irradiation targets 16 abut against the outlet stopper 84 under the effect of gravity, which also contributes to a well-defined positioning of the irradiation targets 16 in the decay conduit 52.

The outlet stopper 84 is displaceable between a stop position, in which it blocks movement of the irradiation targets 16 out of the decay station 30 through the decay conduit outlet 58 and a release position, in which it allows movement of the irradiation targets 16 out of the decay station 30 through the decay conduit outlet 58.

In the stop position, the outlet stopper 84 preferably allows gas flow there-through.

The outlet stopper 84 has a structure which is similar to that of the lock element 70 of the inlet distributor 68. For example, it comprises a stop pin 86, configured to extend radially through the decay conduit 52 in the stop position of the outlet stopper 84 so as to block the passage of the irradiation targets 16 and a stop pin actuator 88, configured for displacing the stop pin 86 between the stop position and the release position.

More particularly, the stop pin 86 comprises an actuation end, connected to the stop pin actuator 88 and a free end, opposite the actuation end. In the extended position of the stopper 84, the free end of the stop pin 86 abuts against an inner surface of the decay conduit 52. In the extended position, the stop pin 86 extends from one side of the decay conduit 52 to an opposite side, along a diameter of the decay conduit 52. In particular, the length of the stop pin 86 is greater than or equal to the diameter of the decay conduit 52.

In the retracted position, the stop pin 86 is preferably retracted into the housing 50, and does not protrude into the decay conduit 52.

The stop pin actuator 88 is for example a pneumatic, magnetic or hydraulic actuator.

Optionally, the decay station 30 also comprises an inlet stopper 90, located at the decay conduit inlet 56, upstream of the inlet distributor 68, when considering a flow of irradiation targets 16 from the inlet toward the outlet. The inlet stopper 90 is configured for blocking movement of the irradiation targets 16 out of the decay station 30 through the decay conduit inlet 56, and in particular back into the instrumentation tube system 12.

The inlet stopper 90 has the same structure as the outlet stopper 84, the only difference being that, in the stop position, it blocks movement of the irradiation targets 16 out of the decay conduit 52 through the inlet thereof.

Optionally, the decay station 30 further comprises an outlet distributor 92, located at the decay conduit outlet 58, and configured for releasing only a predetermined amount of irradiation targets 16 at a time from the decay station 30 through the decay conduit outlet 58 and for retaining the remaining irradiation targets 16 in the decay conduit 52.

The outlet distributor 92 is shown only schematically in FIG. 3 and is not illustrated in FIG. 1. It has the same structure as the inlet distributor 68, except for the fact that the lock element and the retainer of the outlet distributor 92 are arranged successively in a direction from the decay conduit outlet 58 toward the decay conduit inlet 56. In addition, in the case of the outlet distributor 92, the roles of the inlet and of the outlet are inverted compared to the inlet distributor 68, and the first pressurized gas supply 60 is replaced with the second pressurized gas supply 62, the controller 80 being configured for activating the second pressurized gas supply 62 so as to obtain a flow of pressurized gas through the decay conduit 52 from an inlet end thereof.

Optionally, the decay station 30 further comprises an outlet counter 98, located at the decay conduit outlet 58, and configured for counting the number of irradiation targets 16 passing by it, i.e. in particular exiting the decay conduit 52 through the decay conduit outlet 58. The outlet counter 98 is a device capable of detecting the passage of an irradiation target 16 in front of the outlet counter 98. It has the same structure as the inlet counter 92.

Further optionally, the decay station 30 comprises at least one, and for example a plurality of intermediate irradiation target counters 100, arranged along the decay conduit 52 between the decay conduit inlet 56 and the decay conduit outlet 58, and configured for counting the number of irradiation targets 16 present in the decay conduit 52 at a given time.

The intermediate irradiation target counter(s) 100 are in particular chosen among a temperature sensor and a gamma radiation measurement sensor.

In particular, due to their activation in the core, the irradiation targets 16 have a particular temperature, and the presence of an irradiation target 16 in the decay conduit 52 can therefore be detected based on a temperature measurement. In particular, an irradiation target 16 is detected in the core if the temperature measured by the temperature sensor is greater than or equal to a predetermined threshold depending in particular on the features of the radionuclides contained in the irradiation targets 16.

Alternatively, the presence of an irradiation target 16 in the decay conduit 52 can be detected based on a gamma radiation measurement, each irradiation target 16 present in the decay conduit 52 emitting a specific amount of gamma radiation depending in particular on the features of the radionuclides contained in the irradiation target 16 and of the envelope of the irradiation target 16.

According to one example, and as shown schematically in FIG. 3, the decay station 30 comprises one intermediate irradiation target counter 100 facing each irradiation target 16 in the decay conduit 52. In particular, the adjacent intermediate irradiation target counters 100 are spaced from each other along the length of the decay conduit 52 by a distance corresponding to the length of an irradiation target 16 intended to be contained in the decay conduit 52. For example, the adjacent intermediate irradiation target counters 100 are spaced by a distance comprised between 60 mm and 70 mm, and for example equal to about 70 mm.

According to an alternative, the number of intermediate irradiation target counters 100 may be less than the total number of irradiation targets 16 in the decay conduit 52, in particular in the case where a homogeneous material is activated in all the irradiation targets 16. Indeed, in the case where a homogeneous material is activated in the irradiation targets 16, the values measured by the intermediate irradiation target counters 100 for some of the irradiation targets 16 may be extrapolated for the other irradiation targets 16.

The intermediate irradiation target counter(s) 100 are used as a means of confirming the count performed by the inlet counter 96 and/or the optional outlet counter 98. They differ from the inlet counter 96 and optional outlet counter 98 in that the inlet and outlet counters 96, 98 are configured for counting targets in movement, whereas the intermediate counters 100 are configured for counting stationary targets contained in the decay conduit 52.

In the embodiment shown in FIG. 3, the decay station 30 further comprises an outlet radiation detector 102, configured for measuring the radiation emitted by the irradiation target 16 located in the decay conduit 52 at the decay conduit outlet 58, and for example abutting against the outlet stopper 84.

The outlet radiation detector 102 may be located in the wall of the housing 50 or outside of the housing 50 of the decay station 30, in particular above or below the housing 50.

The outlet radiation detector 102 is located at a distance from the outlet stopper 84, taken along the length of the decay conduit 52, smaller than or equal to the length of one irradiation target 16.

In the embodiment shown in FIG. 3, the outlet radiation detector 102 is located at a fixed position at the decay conduit outlet 58.

Optionally, the decay station 30 further comprises at least one, and for example a plurality of, intermediate radiation detectors 104, configured for measuring the radiation emitted by the irradiation targets 16 at different locations along the length of the decay conduit 52 between the inlet 56 and the outlet thereof 58.

For example, the decay station 30 comprises one radiation detector 102, 104 facing each irradiation target 16 in the decay conduit 52. In this case, the adjacent intermediate radiation detectors 102, 104 are in particular spaced from each other by a distance corresponding to the length of an irradiation target 16 intended to be contained in the decay conduit 52. For example, the adjacent radiation detectors 102, 104 are spaced apart by a distance comprised between 60 mm and 70 mm, and for example equal to about 70 mm.

The optional intermediate radiation detectors 104 are preferably located in the wall of the housing 50 or outside of the housing 50 of the decay station 30, in particular above or below the housing 50.

The radiation detectors 102, 104 may in particular be used for confirming that the radiation, and for example the dose rate, has decreased below a predetermined threshold, thus allowing safe transfer of the activated irradiation targets 16 out of the decay station 30 into the irradiation target discharge system 27, which is less shielded than the decay station 30.

Using one radiation detector 102, 104 per irradiation target 16 allows observing single activation deviations of the irradiation targets 16, compared to an embodiment comprising less radiation detectors 102, 104.

According to an alternative, the total number of radiation detectors 104 may be less than the total number of irradiation targets 16 in the decay conduit 52, in particular in the case where a homogeneous material is activated in all the irradiation targets 16. Indeed, in the case where a homogeneous material is activated in the irradiation targets 16, the values measured by the radiation detectors 102, 104 for some of the irradiation targets 16 may be extrapolated for the other irradiation targets 16.

The outlet radiation detector and/or the intermediate radiation detectors 104 may be a gamma radiation measurement sensor The intermediate radiation detectors 104 may be used as intermediate irradiation target counters 100. In particular, the intermediate radiation detectors 104 may be gamma radiation measurement sensors, which may be used both for measuring the radiation emitted by an irradiation target 16 and for detecting the presence thereof.

According to an alternative (not shown), the outlet radiation detector 102 is displaceable along the decay conduit 52 between the decay conduit inlet 56 and the decay conduit outlet 58 so as to be able to measure the radiation emitted by the irradiation targets 16 at different locations along the length of the decay conduit 52. The outlet radiation detector 102 is in particular displaceable into a position at the decay conduit outlet 58 so as to be able to measure the radiation emitted by the irradiation target 16 located in the decay conduit 52 at the decay conduit outlet 58, and in particular abutting the outlet stopper 84.

The radiation detectors 102, 104 are configured for monitoring the decay of the irradiation targets 16 contained in the decay station 30. They allow discharging from the decay station only the irradiation targets 26 which have sufficiently decayed such that the radiation that they emit is below a predetermined threshold.

The radiation detectors 102, 104 are in particular configured for measuring the dose rate emitted by the irradiation targets 16.

The controller 80 is preferably configured for controlling a displacement of the outlet stopper 84 from the stop position into the release position depending on the results of the measurements of the outlet radiation detector 102, the outlet stopper 84 being for example displaced into its release position when the measured radiation is equal to or lower than a predetermined threshold.

One possible purpose of the decay station 30 being to allow for a decay of the radioactivity of the irradiation targets 16 prior to transferring the irradiation targets 16 into a less shielded area of the installation 6, such as the irradiation target discharge system 27, this feature allows discharging the irradiation targets 16 out of the decay station 30 only when the radiation emitted by the irradiation targets 16, and in particular their dose rate, has decreased to a predefined level.

Figure 4:
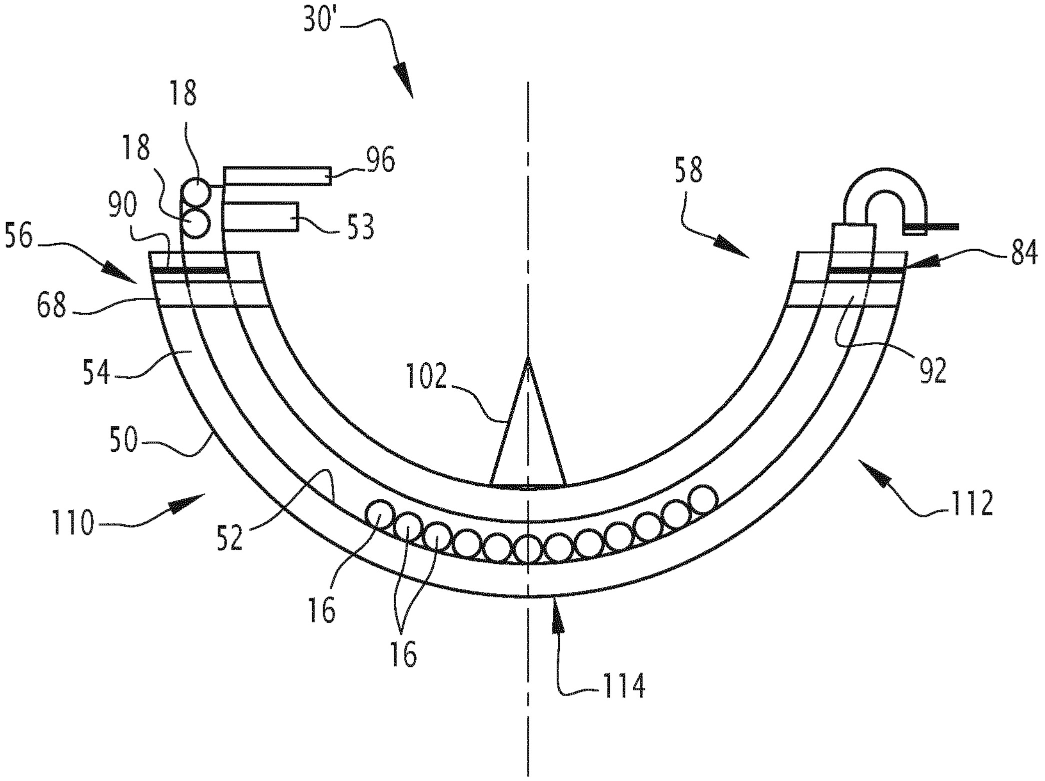
FIG. 4 is a schematic view of a decay station of the installation of FIG. 1 according to a second embodiment.

A decay station 30' according to a second embodiment is shown in FIG. 4. This decay station 30' has the same features as described above with respect to the first embodiment, the only difference being the shape of the decay station 30'.

As can be seen in FIG. 4, in this embodiment, the decay conduit 52 is not rectilinear as in the first embodiment. In the second embodiment, the decay conduit 52 is U-shaped. It comprises a first decay conduit section 110, a second decay conduit section 112 and a bottom 114 formed at the conjunction between the first and second decay conduit sections 110, 112. The first and second decay conduit sections 110, 112 extend upwards from the bottom 114.

In this second embodiment, the housing 50 of the decay station 30' is U-shaped, the walls of the housing 50 delimiting the decay conduit 52 being in particular formed by the radiation shielding 54. The U-shape of the decay conduit 52 ensures a safe storage of the irradiation targets 16 in the decay conduit 52.

The decay station 30' according to the second embodiment is preferably configured for receiving spherical irradiation targets 16. The spherical irradiation targets 16 in particular have a diameter comprised between 1 and 3 mm, and preferably equal to about 1.7 mm.

The irradiation target discharge system 27 will now be described in more detail with reference to FIG. 1.

As can be seen in FIG. 1, the irradiation target discharge system 27 comprises a discharge conduit 120 comprising an inlet end connected to the decay conduit outlet 58 of the decay station 30 and a target exit port 124 configured to be coupled to the target storage container 34.

The linear order of the irradiation targets 16 discharged from the decay station 30 is retained in the discharge conduit 120.

Preferably, the discharge conduit 120 is located outside of the reactor core 10, but preferably within accessible areas inside the reactor containment.

The exit port 124 is located at a free end of the discharge conduit 120. In the example shown in FIG. 1, it comprises a stop valve 126 for pressure tight sealing of the discharge conduit 120.

The exit port 124 can be positioned above the storage container 34 to be filled, or can be coupled and/or removably connected to the assigned storage container 34. The at least one storage container 34 preferably has a shielding to minimize an operator's exposure to radiation from the activated irradiation targets 16.

The irradiation target discharge system 27 further comprises a discharge stopper 128 configured for blocking movement of the irradiation targets 16 to the storage container 34. The discharge stopper 128 is displaceable between a stop position, in which it blocks movement of the irradiation targets 16 to the storage container 34 and a release position, in which it allows movement of the irradiation targets 16 into the storage container 34. The discharge stopper 128 is for example a magnetically or mechanically operated restriction element, preferably a pin crossing the discharge conduit 120.

The irradiation target discharge system 27 may comprise, instead or upstream of the discharge stop 128, a discharge distributor (not shown), located at the exit port 124, and configured for releasing only a predetermined amount of irradiation targets 16 at a time into the storage container 34, the discharge distributor being configured for releasing the irradiation targets 16 closest to the exit port 124, and for retaining the remaining targets in the discharge conduit 120. Preferably, the predetermined amount of irradiation targets 16 is equal to one target such that the discharge distributor is configured for releasing only one irradiation target 16 at a time from the discharge conduit 120. The structure of the optional discharge distributor is the same as that of the inlet distributor 68 of the decay station 30, and will therefore not be described in detail here.

The discharge conduit 120 is, in the embodiment shown in FIG. 1, substantially rectilinear. In this embodiment, the inclination of the discharge conduit 120 is chosen such that the irradiation targets 16 are discharged out of the discharge conduit 120 under the effect of gravity when the discharge stopper 128 is in the release position.

According to an alternative (not shown), the discharge conduit 120 is shaped in the shape of an inverse U and comprises a first discharge conduit section, a second discharge conduit section and an apex formed at a conjunction of the first and second discharge conduit sections. The apex is the highest point of the discharge conduit 120, and the first and second discharge tube sections are directed downwardly from the apex. Such a U-shaped discharge tube is for example described in patent application EP3326175 A1 filed by the Applicant.

Other profiles of the discharge conduit 120 are also possible.

The irradiation target discharge system 27 additionally comprises at least one pressurized gas inlet opening 130 formed in the wall of the discharge conduit 120. In the embodiment shown in FIG. 1, the pressurized gas inlet opening 130 is located between the stop valve 126 and the discharge stopper 128. It is connected to a pressurized gas supply, for example to pressurized gas source 63, and forms a part of the irradiation target drive system 25 of the installation 6.

Optionally, the irradiation target discharge system 27 further comprises a radiation detector 134 configured for measuring the radiation emitted by the irradiation targets 16 contained in the discharge conduit 120, and in particular the radiation dose rate emitted by the irradiation targets 16 contained in the discharge conduit 120.

Optionally, the irradiation target discharge system 27 may comprise a discharge counter 140 configured for counting the number of irradiation targets 16 moving into the discharge conduit from the decay station 30. The discharge counter 140 is configured for counting the number of irradiation targets 16 passing by the discharge counter 140. The discharge counter 140 is a device capable of detecting the passage of an irradiation target 16 in front of the discharge counter 140. The discharge counter 140 has the same structure as the inlet counter 96 described above.

Optionally, the installation 6 further comprises an instrumentation tube system target counter 144, arranged at the inlet of the instrumentation tube system 12 downstream of the diverter 30 with respect to the direction of displacement of the targets 16, 18 into the instrumentation tube system 12, and configured for counting the number of irradiation targets 16 or dummy targets 18 moving into or out of the instrumentation tube system 12. The instrumentation tube system target counter 144 is in particular a device capable of detecting the passage of a magnetic target in front of the counter 144, for example of a dummy target 18.

Preferably, the instrumentation tube system target counter 144 is positioned upstream of an isolation valve of the instrumentation tube system 12, this isolation valve being configured for pressure tight sealing of the instrumentation tube system 12.

Optionally, the irradiation target feed system 12 may also comprise such a target counter (not shown), disposed upstream of the diverter 30 relative to the direction of displacement of the targets 16, 18 into the instrumentation tube system 12.

In the above description, the decay station 30 was described as being connected to an instrumentation tube system 12 of a core of a nuclear reactor. However, this decay station 30 might be connected to other structures of the core of a nuclear reactor than the instrumentation tube system 12, depending on the needs, with the same advantages.

A diverter 32 according to a first embodiment will now be described with reference to FIG. 5.

Figure 5:
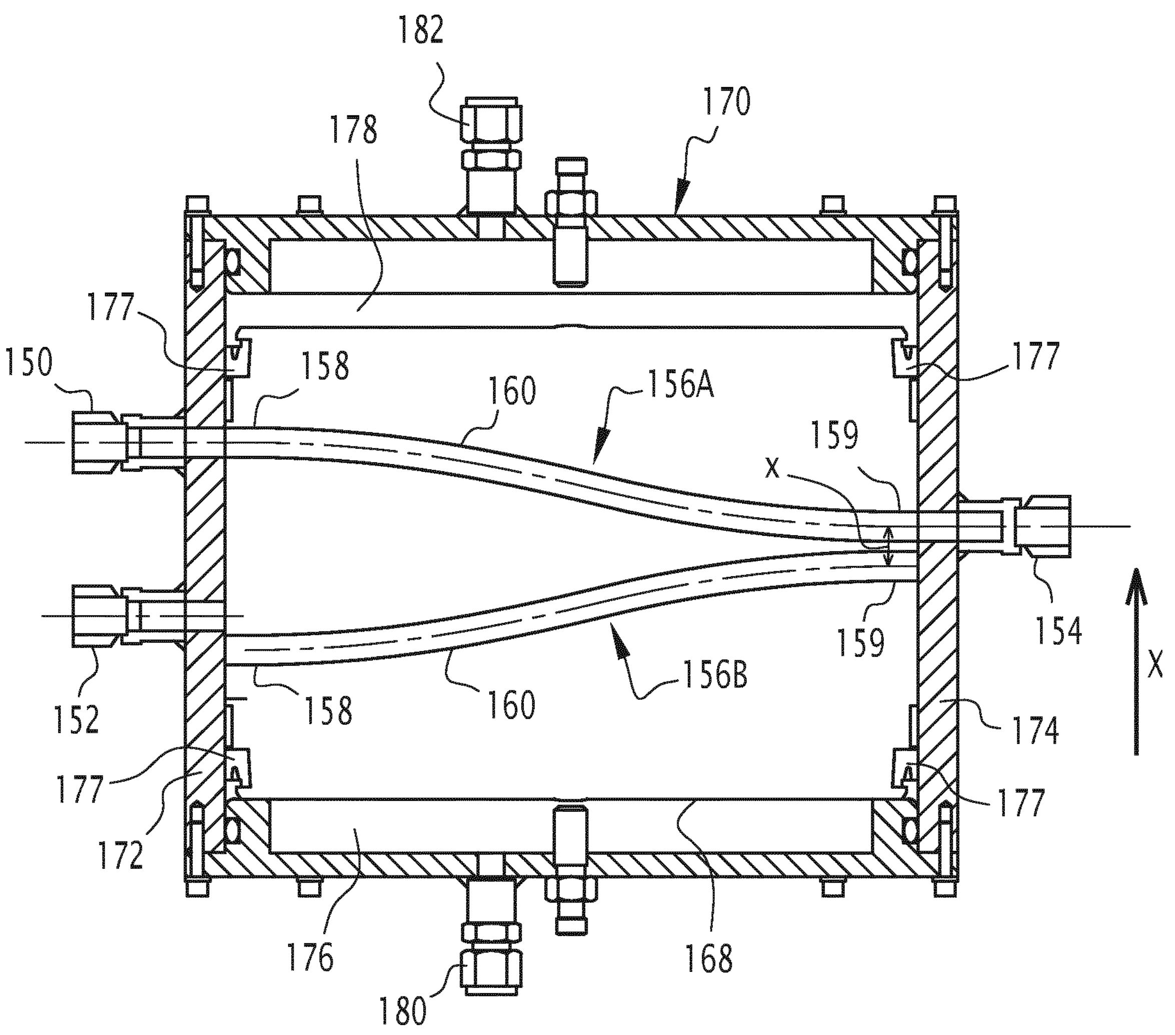
FIG. 5 is a schematic cross-sectional view of a diverter according to a first embodiment.

As shown in FIG. 5, the diverter 32 according to the first embodiment comprises:

- a first connector 150 intended to be connected to the irradiation target discharge system 27;
- a second connector 152 intended to be connected to the irradiation target feed system 21; and
- a third connector 154 intended to be connected to the instrumentation tube system 12.

More particularly, each connector 150, 152, 154 is intended to be connected to a respective conduit for the displacement of the targets 16, 18. For example, the first connector 150 is intended to be connected to the decay conduit 52 of the decay station 30, the second connector 152 is intended to be connected to the feed tube 23 of the irradiation target feed system 21 and the third connector 154 is intended to be connected to a conduit 13 of the instrumentation tube system 12.

The first connector 150 may be connected to the irradiation target discharge system 27 either directly, i.e. without interposition of intermediate systems between the irradiation target discharge system 27 and the diverter 32 or indirectly, for example by being connected to the decay station 30, as shown for example in FIG. 1.

The third connector 154 is spaced apart from the first connector 150 and the second connector 152 along the horizontal direction. In addition, in the example shown in FIG. 5, the first connector 150 and the second connector 152 are substantially aligned along the vertical direction. The third connector 154 is for example located at a height intermediate between the heights of the first and second connectors 150, 152.

The displacement of the targets 16, 18 through the diverter 32 is driven by the target drive system 25 described above.

The diverter 32 comprises at least one diverter conduit 156 which is movable between a first position, in which it connects one of the first connector 150 and the second connector 152 to the third connector 154 so as to define a path for the targets 16, 18 from the one of the first connector 150 and the second connector 152 to the third connector 154, and a second position, in which it does not connect the one of the first connector 150 and the second connector 152 to the third connector 150.

More particularly, in the example shown in FIG. 5, the diverter 32 comprises a first diverter conduit 156A and a second diverter conduit 156B.

The geometry of the diverter conduits 156A, 156B is chosen in such a manner that it minimizes the size of the diverter 32. In particular, each diverter conduit 156A, 156B is shaped in such a manner that it induces, along its length, two changes of direction of the targets 16, 18 intended to circulate therein. This particular shape of the diverter conduits 156A, 156B provides for a more compact diverter 32, than, for example, an embodiment in which the diverter conduits 156A, 156B are straight along their entire length. Such a compact shape is important, since the space available for the diverter 32 within the nuclear reactor is limited.

Each change of direction occurs at a distance from the longitudinal ends of the diverter conduits 156A, 156B.

More particularly, each diverter conduit 156A, 156B comprises a substantially straight end section 158, 159 at each end of the diverter conduit 156A, 156B and an intermediate section 160, extending between the end sections 158, 159. The ends sections 158, 159 are preferably parallel to each other, and in particular extend substantially horizontally. For example, the central axes of the end sections 158, 159 are offset from each other along a direction perpendicular to their longitudinal direction, and in particular along the vertical direction. The offset x is strictly greater than zero, and for example comprised between 10 and 50 mm.

In the embodiment shown in FIG. 5, the intermediate section 160 is curved.

Preferably, for each diverter conduit 156A, 156B, the transition between the curved intermediate section 160 and each of the substantially straight end sections 158, 159 is continuous, i.e. without angles. Preferably, in this embodiment, the central axis of the diverter conduit 156A, 156 forms a continuous line. In the example shown in FIG. 5, the intermediate section 160 bends continuously between its two ends. This continuous bending of the diverter conduit 156A, 156B and the absence of angles along its length allows for a particular smooth displacement of the targets 16, 18 through the diverter conduits 156A, 156B, despite the changes of direction.

In the example shown in FIG. 5, the intermediate section 160 preferably includes a concave section and a convex section separated by an inflexion point. In particular, the inflexion point is located in the geometric middle of the central axis of the intermediate section 160, measured along the central axis of the intermediate section 160.

The radius of curvature of each diverter conduit 156A, 156B and the diameter thereof are chosen depending on the length and diameter of the targets 16, 18 so as to result in a smooth displacement of the targets 16, 18 through the conduits 156A, 156B.

Preferably, the radius of curvature of each diverter conduit 156A, 156B at the junction between each of the end sections 158 and the intermediate section 160 is comprised between 200 and 800 mm. Tests performed by the inventors show that this particular radius of curvature results in a particularly small size of the diverter 32 combined with a substantially resistance-free displacement of the targets 16, 18 through the diverter conduits 156A, 156B. This geometry is in particular advantageous in the case of cylindrical targets 16, 18 with a circular base having a diameter comprised between 9 mm and 12 mm and a length comprised between 9 mm and 80 mm.

According to an alternative embodiment (not shown), the intermediate section 160 is straight, rather than curved as shown in FIG. 5 and described above. This embodiment has the advantage of being easier to manufacture compared to the embodiment with the curved intermediate section 160.

For each diverter conduit 156A, 156B, the absolute value of an angle between the direction of the end sections 158, 159 and the central axis of the intermediate section 160 and the diameter of the diverter conduit 156A, 156B are chosen depending on the length and diameter of the targets 16, 18 so as to result in a smooth displacement of the targets 16, 18 through the conduits 156A, 156B.

In this embodiment, for each diverter conduit 156A, 156B, the absolute value of an angle between the direction of the end sections 158, 159 and the central axis of the intermediate section 160 is comprised between 2° and 5°. Tests performed by the inventors show that this particular angle of inclination of the intermediate section 160 results in a particularly small size of the diverter 32 combined with a substantially resistance-free displacement of the targets 16, 18 through the diverter conduits 156A, 156B. This geometry is in particular advantageous in the case of cylindrical targets 16, 18 with a circular base having a diameter comprised between 9 mm and 12 mm and a length comprised between 9 mm and 80 mm.

The first and second diverter conduits 156A, 156B are preferably symmetric relative to a median plane between these two conduits 156A, 156B. The first diverter conduit 156A for example extends downwards from the first connector 150 to the third connector 154, while the second diverter conduit 156B extends upwards from the second connector 152 to the third connector 156.

The first diverter conduit 156A connects the first connector 150 to the third connector 154 in its first position so as to define a path for the displacement of the targets 16, 18 from the first connector 150 to the third connector 154. In this position, in the example shown in FIGS. 1 to 4, the first diverter conduit 156A defines a path for the displacement of the targets 16, 18 between the decay station 30 and the instrumentation tube system 12. In the configuration of the diverter 32 shown in FIG. 5, the first diverter conduit 156A is in its first position.

More particularly, in the first position, the ends of the first diverter conduit 156A are aligned respectively with the first connector 150 and the third connector 154.

In the second position of the first diverter conduit 156A, the first diverter conduit 156A does not connect the first connector 150 to the third connector 154. For example, in the second position, the ends of the first diverter conduit 156A are not aligned with the first connector 150 and the third connector 154. Therefore, no displacement of targets 16, 18 is possible between the first connector 150 and the third connector 154, and therefore, in this particular example, between the decay station 30 and the instrumentation tube system 12.

The second diverter conduit 156B connects the second connector 152 to the third connector 154 in its first position so as to define a path for the displacement of the irradiation targets 16, 18 from the second connector 152 to the third connector 154. In this position, in the example shown in FIGS. 1 to 4, the second diverter conduit 156B defines a path for the displacement of the targets 16, 18 between the irradiation target feed system 21 and the instrumentation tube system 12.

More particularly, in the first position, the ends of the second diverter conduit 156B are aligned respectively with the second connector 152 and the third connector 154.

In the second position of the second diverter conduit 156B, the second diverter conduit 156B does not connect the second connector 150 to the third connector 154. For example, in the second position, the ends of the second diverter conduit 156B are not aligned with the second and the third connector 152, 154. Therefore, no displacement of targets 16, 18 is possible between the second connector 152 and the third connector 154, and therefore, in this particular example, between the irradiation target feed system 21 and the instrumentation tube system 12.

In the configuration shown in FIG. 5, the second diverter conduit 156B is in its second position.

The configuration of the diverter 32 shown in FIG. 5 corresponds to the first configuration of the diverter 32. In the configuration shown in FIG. 5, the diverter 32 defines a path for the displacement of the targets 16, 18 from the decay station 30 to the instrumentation tube system 12.

The configuration of the diverter 32 in which the first diverter conduit 156A is in the second position and the second diverter conduit 156B is in the second position corresponds to the second configuration of the diverter 32. In this configuration, the diverter 32 defines a path for the displacement of the targets 16, 18 between the irradiation target feed system 21 and the instrumentation tube system 12.

Thanks to its structure, in the first configuration of the diverter 32, the diverter 32 allows transferring the targets 16, 18 directly from the conduit connected to the first connector 150, for example the decay conduit 52, into the conduit connected to the third connector 156, for example the conduit 13 of the instrumentation tube system 12, i.e. there is a direct communication between these conduits through the diverter 32 in the first configuration of the diverter 32.

In the second configuration of the diverter 32, the diverter 32 allows transferring the targets 16, 18 directly from the conduit connected to the second connector 152, for example the feed tube 23 of the irradiation target feed system 21, into the conduit connected to the third connector 156, for example the conduit 13 of the instrumentation tube system 12, i.e. there is a direct communication between these conduits through the diverter 32 in the second configuration of the diverter 32.

The diverter 32 further comprises an actuator, configured for displacing the least one diverter conduit 156 from the second position into the first position and/or from the first position into the second position, for example by rotation or by translation.

In the example shown in FIG. 5, the actuator comprises a piston 168. In this example, the piston 168 delimits the first and the second diverter conduits 156A, 156B therein.

The piston 168 is movable between a first position, shown in FIG. 5, in which the first diverter conduit 156A is in its first position and the second diverter conduit 156B in its second position and a second position (not shown) in which the first diverter conduit 156A is in its second position and the second diverter conduit 156B in its first position. The diverter 32 is configured such that the first diverter conduit 156A is in its first position when the second diverter conduit 156B is in its second position and vice versa.

The piston 168 is preferably a pneumatic piston.

More particularly, in the example shown in FIG. 5, the diverter 32 comprises a diverter housing 170 comprising a first wall 172 and a second wall 174, spaced apart from each other, the diverter conduits 156A, 156B extending from the first wall 172 to the second wall 174. In the example shown in FIG. 5, the first and second walls 172, 174 are substantially parallel. The first and second connectors 150, 152 are for example provided on the first wall 172 and the third connector 156 is provided on the second wall 174.

The piston 168 is received in the housing 170 so as to be able to slide therein along a direction of displacement X relative to the housing 170. The direction of displacement X is, in particular, perpendicular to the axes of the end sections 158, 159 of the diverter conduits 156A, 156B, and more particularly vertical.

A first and a second chamber 176, 178 are delimited between the piston 168 and the housing 170, these chambers 176, 178 being located on either side of the piston 168 along the direction of displacement X of the piston 168.

The diverter housing 170 further comprises an inlet port 180, intended for introducing a pressurized fluid into the first chamber 176 so as to displace the piston 168 from its first position into its second position and an outlet port 182, intended for allowing removal of air from the second chamber 178 during displacement of the piston 168.

The piston 168 is configured for returning into its first position in the absence of pressurized fluid in the first chamber 176. In this embodiment, the first position of the piston 168 corresponds to a passive safety position, since it connects the instrumentation tube system 12 to the decay station 30, and therefore to an area with a strong radiation shielding.

In the example shown in FIG. 5, the first diverter conduit 156A is located above the second diverter conduit 156B, and the piston 168 is configured for moving upwards from the first position to the second position and downwards from the second position to the first position.

The diverter 32 preferably includes sealing means 177 configured for sealing a space between the piston 168 and the first and second walls 172, 174 of the diverter housing 170. The sealing means 177 are for example provided in the form of sealing rings extending around the circumference of the piston 168.

The longest dimension of the piston 168 in a plane perpendicular to the direction of displacement of the piston 168 depends on the offset x between the end sections 158, 159 of the conduits 156A, 156B and on the geometry of each of the conduits 156A, 156B, in particular on the angle between the end sections 158, 159 and the intermediate section 160 or the radius of curvature at the junction between the end sections 158, 159 and the intermediate section 160.

The diverter housing 170 is, in particular, cylindrical, for example with a circular base. In this case, the first and second connectors 150, 152 are for example formed on one base of the cylinder, and the third connector 154 is formed on an opposite base of the cylinder. The piston 168 has a shape corresponding to that of the diverter housing 170, in particular cylindrical with a circular base, the diameter of the base substantially corresponding to that of the diverter housing 170.

In this embodiment, the actuator also includes the pressurized gas supply for the displacement of the piston 168.

The switching unit 40 is configured for controlling the supply of a predetermined amount of pressurized gas to the first chamber 176 so as to displace the piston 168 from its first position into its second position, and therefore place the diverter 32 into its second configuration. Displacement of the piston 168 from the second position into the first position is obtained in the absence of injection of pressurized gas into the first chamber 176.

A diverter 32' according to a second embodiment will now be described with reference to FIG. 6. On this figure, the elements which are identical to those shown in FIG. 5 in relation with the diverter 32 according to the first embodiment are designated by the same reference numerals.

The diverter 32' according to the second embodiment differs from the diverter 32 according to the first embodiment in that there is only one diverter conduit 156. More particularly, the diverter conduit 156 connects the first connector 150 to the third connector 154 in the first position thereof, and the second connector 152 to the third connector 154 in the second position thereof.

In this embodiment, the diverter conduit 156 is rotatable between the first position and the second position.

More particularly, in this embodiment, the diverter 32' comprises a support 180, for example a plate, on which the first and second connectors 150, 152 are provided, and a rotatable conduit carrier 182, for example a disc, which is mounted on the support 180 so as to be rotatable relative thereto about an axis of rotation R perpendicular to a plane of the support 180.

One end 184 of the diverter conduit 156 is mounted onto the rotatable conduit carrier 182 such that the rotation of the rotatable conduit carrier 182 displaces the diverter conduit 156 between its first position and its second position. The axis of rotation R is aligned with the axis of the end section 159 of the diverter conduit 156 located opposite the end of the diverter conduit 156 mounted onto the rotatable conduit carrier 182.

Depending on the angular position of the rotatable conduit carrier 182, the end section 158 of the diverter conduit 156 closest to the support 180 is either in alignment with the first connector 150 or with the second connector 152, respectively defining a path for the displacement of the targets 16, 18 from the first connector 150 to the third connector 154 or from the second connector 152 to the third connector 154.

The position of the end section 159 of the diverter conduit 156 does not change during the rotation of the rotatable conduit carrier 182.

Figure 6:
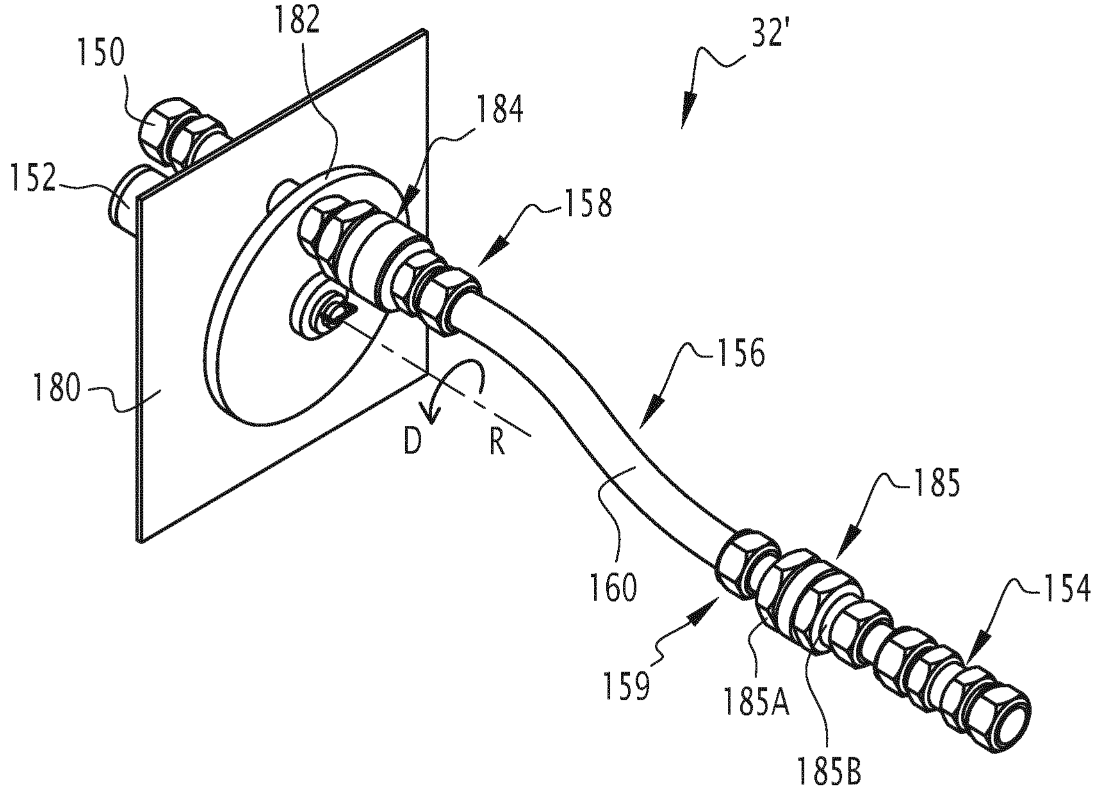
FIG. 6 is a schematic cross-sectional view of a diverter according to a second embodiment.

For example, in the example shown in FIG. 6, in which the first connector 150 is located above the second connector 152 and vertically aligned therewith, a rotation of the diverter conduit 156 about the axis of rotation R of 180 degrees in a first direction of rotation D brings the diverter conduit 156 from its first position into its second position, and a rotation of the diverter conduit 156 about the axis of rotation R of 180 degrees in a second direction, opposite to the first direction of rotation D brings the diverter conduit 156 from its second position into its first position.

The third connector 154 is in particular fixedly received in a fixed support structure (not shown). The fixed support structure is for example formed by a plate, which in particular extends parallel to the plate forming the support 180. The fixed support structure and the support 180 may in particular be part of a diverter housing additionally comprising at least one connection wall connecting the fixed support structure to the support 180. The diverter housing may be analogous to that shown in FIG. 5.

The end section 159 of the diverter conduit 156 is connected to the third connector 154 through an intermediate connector 185, which allows for a relative rotation of the diverter conduit 156 relative to the third connector 154. The intermediate connector 185 is for example a quick coupling system comprising two separate parts 185A, 185B, which are rotatable relative to one another, and thus allow for the relative rotation of the diverter conduit 156 relative to the third connector 154.

In this embodiment, the actuator for example comprises a motor, configured for rotating the diverter conduit 156 in the first or second direction of rotation by a predetermined angle so as to displace it between the first position and the second position. The motor is more particularly connected to the rotatable conduit carrier 182 by any adapted means so as to drive the rotation of the rotatable conduit carrier 182 in the first or second direction of rotation by a predetermined angle.

The switching unit 40 is configured for controlling the motor depending on the needs.

The geometry of the diverter conduit 156 is identical to that described for the diverter conduits 156A, 156B.

A method for producing activated irradiation targets 16 using the installation 6 described above comprises the following steps:

passing 200 a quantity $q_1$ non-activated irradiation targets 16 into the instrumentation tube system 12 from the irradiation target feed system 21;

exposing 202 this quantity $q_1$ of non-activated irradiation targets 16 to neutron flux in the instrumentation tube system 12 for a predetermined irradiation duration $d_1$ so as to obtain a quantity $q_1$ of partially activated irradiation targets 16, the predetermined irradiation duration $d_1$ being equal to or smaller than the minimum activation time for complete conversion of the precursor material of the irradiation targets (16) to a desired radionuclide; and passing 204 the quantity $q_1$ of irradiation targets 16 from the instrumentation tube system 12 into the decay station 30; and discharging 214 at least some irradiation targets 16 from the decay station 30 into the target storage container 34, in particular through the discharge system 27.

Figure 7:
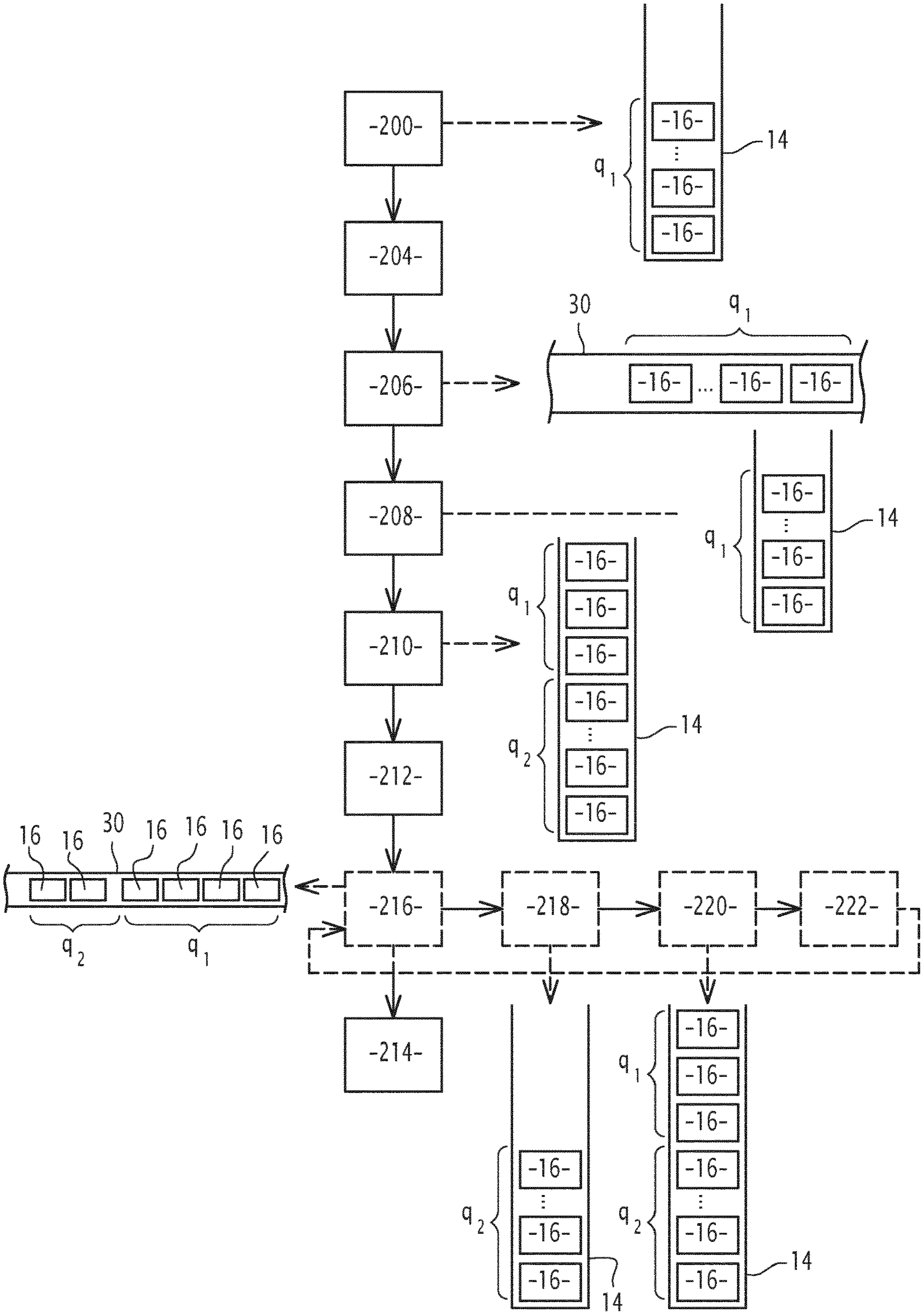
FIG. 7 is a schematic view of a method for producing activated irradiation targets in an instrumentation tube system of a nuclear reactor.

The method according to a first embodiment will now be described more particularly with reference to FIG. 7.

According to the first embodiment, the predetermined irradiation duration $d_1$ being strictly smaller than the minimum activation time required for complete conversion of the precursor material contained in the irradiation targets 16 to a desired radionuclide.

Therefore, the first quantity $q_1$ of irradiation targets 16 obtained at the end of step 204 is a first quantity $q_1$ of partially activated irradiation targets 16. During step 206, this first quantity $q_1$ of partially activated irradiation targets 16 is passed from the instrumentation tube system 12 into the decay station 30.

The method according to this embodiment further comprises the following successive steps between the steps 206 and 214:

passing 208 a quantity $q_2$ of non-activated irradiation targets 16 from the irradiation target feed system 21 into the instrumentation tube system 12;

passing 210 the quantity $q_1$ of partially activated irradiation targets 16 back from the decay station 30 into the instrumentation tube system 12;

exposing 212 the quantity $q_1$ of partially activated irradiation targets 16 and the quantity $q_2$ of non-activated irradiation targets 16 to neutron flux in the instrumentation tube system 12 for a predetermined irradiation duration $d_2$, so as to obtain a quantity $q_1$ of partially activated or fully activated irradiation targets 16 and a quantity $q_2$ of partially activated irradiation targets 16.

Preferably, during step 214, the irradiation targets 16 discharged from the decay station 30 into the target storage container 34 are fully activated irradiation targets 16.

The "passing" steps mentioned above are carried out by the target drive system 25.

During the step 210, the partially activated irradiation targets 16 are transferred out of the decay station 30 through the inlet distributor 68, which only lets a predetermined amount A of irradiation targets 16 pass at a time, while retaining the remaining irradiation targets 16 in the decay station 30.

More particularly, for releasing the predetermined amount A of irradiation targets 16, the following steps are carried out:

step a1: displacement of the lock element 70 from the release position into the locking position by means of the first actuator 74;

step a2: activation of the pressurized gas supply 60 so as to obtain a flow of pressurized gas through the decay conduit 52 from an outlet 58 thereof, the flow of pressurized gas pushing the irradiation targets 16 contained in the decay conduit 52 toward the inlet 56 thereof until they abut against the lock element 70 positioned in the locking position;

step a3: displacement of the retainer 72 by means of the second actuator 76 from the retracted position into the extended position, in which the retainer 72 abuts against an irradiation target 16 contained in the decay conduit 52;

step a4: displacement of the lock element 70 from the locking position into the release position by means of the first actuator 74 such that the predetermined amount of irradiation targets 16, corresponding to the irradiation targets 16 located downstream of the retainer 72 in the direction of pressurized gas flow, are carried out of the decay conduit 52 through the decay conduit inlet 56 by the flow of pressurized gas, while the remaining irradiation targets 16, i.e. the irradiation target 16 against which the retainer 72 abuts and the irradiation targets 16 located upstream thereof, are retained in the decay conduit 52 by means of the retainer 72 positioned in the extended position.

Preferably, the flow of pressurized gas remains activated throughout steps a2 to a4.

More particularly, during step a3, the retainer 72 abuts against the irradiation target 16 facing the retainer 72, this irradiation target 16 extending on either side of the retainer 72 along the length of the decay conduit 52.

The quantity $q_1$ is preferably a multiple of the predetermined amount A of irradiation targets such that $q_1=m*A$, where m is an integer greater than or equal to one, and preferably strictly greater than one.

In the case where m is strictly greater than one, during step 210, the above-sequence of steps a1 to a4 is repeated m times such that the quantity $q_1$ of irradiation targets 16 is released from the decay station 30.

In the preferred example where the predetermined amount A of irradiation targets 16 is equal to one, the above sequence of steps a1 to a4 is repeated $q_1$ times.

Preferably, during step 210, the inlet counter 96 counts the number of irradiation targets 16 transferred from the decay station 30 into the instrumentation tube system 12, and the above sequence of steps a1 to a4 is repeated until the quantity $q_1$ of irradiation targets 16 has been transferred to the instrumentation tube system 12.

During step 210, the quantity $q_1$ of partially activated irradiation targets 16 from the decay station 30 is transferred into the instrumentation finger 14 in which the quantity $q_2$ of irradiation targets 16 passed into the instrumentation finger 14 during step 208 is contained, and occupies positions in this instrumentation finger 14 located above the quantity $q_2$ of non-activated irradiation targets 16.

Therefore, at the end of the step 210, the instrumentation finger 14 contains, in a direction from the bottom to the top thereof, the quantity $q_2$ of non-activated irradiation targets and the quantity $q_1$ of partially activated irradiation targets 16.

Step 214 is a step of discharging the quantity $q_1$ of fully activated irradiation targets 16 from the decay station 30.

During this step, the quantity $q_1$ is discharged through the decay station outlet 58 of the decay station 30 and passed into the discharge system 27 by means of the target drive system 25.

According to one example, during step 214, the outlet stopper 84 is opened and the irradiation targets 16 are carried into the discharge conduit 120 by a flow of pressurized gas flowing in a direction from the inlet 56 to the outlet 58 of the decay conduit 52 until they abut against the discharge stopper 128. The discharge stopper 128 is then opened such that the irradiation targets 16 may be discharged into a corresponding discharge container 34.

In the embodiment in which the decay station 30 comprises an outlet distributor 92, the quantity $q_1$ is discharged through the decay station outlet 58 in batches corresponding to the predetermined amount by carrying out steps a1 to a4 as described above, where "inlet" is replaced with "outlet" and "outlet" is replaced with "inlet".

Optionally, the radiation, and in particular the dose rate, emitted by the quantity $q_1$ of irradiation targets 16 present in the discharge conduit 52 is measured by the outlet radiation detector 102 and/or by the optional intermediate radiation detectors 104, prior to discharging the irradiation targets 16 from the decay station 30, the irradiation targets 16 being discharged only if the measured radiation, and in particular dose rate, is below a predetermined threshold.

During step 214, only the quantity $q_1$ of fully activated irradiation targets 16 is discharged from the decay station 30. According to a preferred embodiment, only the quantity $q_1$ of irradiation targets 16 is present in the decay station 30 at the time of discharging the quantity $q_1$ of fully activated irradiation targets 16.

Preferably, the method comprises, between steps 212 and 214, a step 216 of passing the quantity $q_1$ of fully or partially activated irradiation targets 16 and the quantity $q_2$ of partially activated irradiation targets 16 into the decay station 30.

Step 216 is carried out by the target drive system 25. During step 216, the first and second quantities of irradiation targets 16 are preferably driven into the decay station 30 by the irradiation target drive system 25 until they abut against the outlet stopper 84 of the decay station 30, or, if an outlet distributor 92 is present, against the lock element of the outlet distributor 92.

The linear order of the irradiation targets 16 is retained during this step, such that the quantity $q_1$ of fully or partially activated irradiation targets 16 is located closer to the decay conduit outlet 52 than the quantity $q_2$ of partially activated irradiation targets 16.

After step 216, a quantity $q_1$ of non-activated irradiation targets 16 is passed into the instrumentation tube system 12 (step 218) and the quantity $q_2$ of partially activated irradiation targets 16 is passed back into the instrumentation tube system 12 through implementation of step a1 to a4 described above using the target drive system 25 (step 220).

At the end of step 220, the instrumentation finger 14 contains, in a direction from the bottom to the top thereof, the quantity $q_1$ of non-activated irradiation targets 16 and the quantity $q_2$ of partially activated irradiation targets 16.

After step 220, the method comprises a step 222 of exposing the irradiation targets 16 contained in the instrumentation finger 14 to neutron flux in the core 10 of the nuclear reactor for a predetermined irradiation duration $d_3$ so as to obtain a quantity $q_1$ of partially activated irradiation targets 16 and a quantity $q_2$ of fully activated irradiation targets.

Steps 216, 218, 220 and 222 may be repeated a plurality of times, each repetition resulting in a batch of fully activated irradiation targets 16 being produced. Each batch of fully activated irradiation targets 16 is discharged from the decay station through step 214.

Optionally, the method comprises a step of displacing the diverter 32 into the second configuration prior to passing the irradiation targets 16 from the irradiation target feed system 21 into the instrumentation tube system 12 during steps 200, 208 and 218 and a step of displacing the diverter 32 from the second configuration into the first configuration prior to passing the irradiation targets 16 from the instrumentation tube system 12 into the decay station 30 during steps 206, 210 and 220.

Preferably, the inlet counter 96 counts the number of irradiation targets 16 transferred from the instrumentation tube system 12 into the decay station 30 or from the decay station 30 into the instrumentation tube system 12 in steps 206, 210, 216 and 220.

The quantity $q_1$ is preferably equal to the quantity $q_2$.

Preferably, all the irradiation durations during which the irradiation targets 16 are exposed to neutron flux in the core of the nuclear reactor, for example $d_1$, $d_2$ and $d_3$, are identical.

According to one example, each of these irradiation durations is equal to half minimum activation time for complete conversion of the precursor material contained in the irradiation targets 16 to a desired radionuclide. In this case, the quantity $q_1$ of irradiation targets 16 obtained at the end of step 212 and the quantity of irradiation targets 16 located at the top of the instrumentation finger 14 at the end of step 222 are fully activated irradiation targets 16. These fully activated irradiation targets may thus be retrieved from the installation 6 with a retrieval period corresponding to half the activation time of the desired radionuclide.

In fact, each of these irradiation durations may correspond to a fraction equal to 1/M of the minimum activation time for complete conversion of the precursor material contained in the irradiation targets 16 to a desired radionuclide. The integer M is chosen depending on the relationship between the desired retrieval interval and the minimum activation time for complete conversion of the precursor material contained in the irradiation targets 16 to a desired radionuclide. In this case, the instrumentation finger 14 comprises may comprise irradiation targets 16 in M different stages of activation at the end of step 222, and the irradiation targets 16 of each batch have to be exposed M times to neutron flux in the core 10 before being fully activated. In such a case, the quantity $q_1$ of irradiation targets 16 obtained at the end of step 212 is only partially activated, and these irradiation targets 16 have to be returned into the instrumentation finger 14 for exposure to neutron flux as many times as necessary for achieving the minimum activation time.

Optionally, the method additionally comprises, after step 216 and before discharging the fully activated irradiation targets 16 in step 214, a step of holding the fully activated irradiation targets 16 in the decay station 30 for a decay duration $d_4$.

The decay duration $d_4$ corresponds to the time required for the radiation, and in particular the dose rate, emitted by the quantity $q_1$ of fully activated irradiation targets 16 to fall below a predetermined threshold. According to one example, the decay duration da is predetermined depending on the nature of the material contained in the irradiation targets 16. According to an alternative, the decay duration da depends on the measurement of the radiation, and in particular the dose rate, by the outlet radiation detector 102 and/or by the optional intermediate radiation detectors 104.

According to this option, step 214 is carried out after the quantity of fully activated irradiation targets 16 has been held in the decay station 30 for the decay duration $d_3$.

According to one particular example, batches of N irradiation targets are to be delivered at a delivery interval equal to half the minimum activation time for complete conversion of the precursor material contained in the irradiation targets 16 to a desired radionuclide, optionally increased by the decay duration da necessary for the radiation, and in particular the dose rate, emitted by the quantity $q_1$ of fully activated irradiation targets 16 to fall below a predetermined threshold.

In this particular example, all of the predetermined irradiation durations are equal to 50% of the minimum activation time for complete conversion of the precursor material contained in the irradiation targets 16 to a desired radionuclide.

In step 200 of the method, N non-activated irradiation targets 16 are passed into an instrumentation finger 14 from the irradiation target feed system 21.

In step 204, these N non-activated irradiation targets 16 are subjected to neutron flux in the core of the nuclear reactor for a time equal to half the minimum activation time for complete conversion of the precursor material contained in the irradiation targets 16.

In step 206, these N partially activated irradiation targets 16 are transferred into the decay station 30.

In step 208, N non-activated irradiation targets 16 are passed into the instrumentation finger 14 from the irradiation target feed system 21.

In step 210, the N partially activated irradiation targets 16 are passed into the instrumentation finger 14 from the decay station 30 such that the instrumentation finger contains, from bottom to top, N non-activated irradiation targets 16 and N partially-activated irradiation targets 16.

In step 212, the irradiation targets 16 contained in the instrumentation finger 14 are subjected to neutron flux in the core of the nuclear reactor for a time equal to half the minimum activation time for complete conversion of the precursor material contained in the irradiation targets 16 so as to obtain N fully activated irradiation targets 16 and N partially activated irradiation targets 16.

In step 216, the N fully activated irradiation targets 16 and N partially activated irradiation targets 16 are passed from the instrumentation finger 14 into the decay station 30, the linear order of the irradiation targets 16 being preserved. The N fully activated irradiation targets 16 are thus located closer to the outlet of the decay station 30 than the N partially activated irradiation targets 16.

The N fully activated irradiation targets 16 are then discharged into a discharge container 34 in step 214. Optionally, they remain in the decay station 30 for the predetermined decay duration $d_4$ prior to their discharge in step 214.

In step 218, N non-activated irradiation targets 16 are passed into the instrumentation finger 14 from the irradiation target feed system 21.

In step 220, the N partially activated irradiation targets 16 stored in the decay station 30 are passed from the decay station 30 into the instrumentation finger 14 such that the instrumentation finger contains, from bottom to top, N non-activated irradiation targets 16 and N partially-activated irradiation targets 16.

In step 222, the irradiation targets 16 contained in the instrumentation finger 14 are subjected to neutron flux in the core of the nuclear reactor for a time equal to half the minimum activation time for complete conversion of the precursor material contained in the irradiation targets 16 so as to obtain N fully activated irradiation targets 16 and N partially activated irradiation targets 16.

Steps 216 to 222 may be repeated as often as necessary, each repetition of these steps resulting in the production of a batch of N fully activated irradiation targets 16 with a production duration equal to half the minimum activation time for complete conversion of the precursor material contained in the irradiation targets 16 to a desired radionuclide. This batch may then be discharged through step 214, after an optional decay duration $d_4$ in the decay station 30.

The installation 6 described above preferably comprises a controller 160 configured for implementing the above-described method.

In particular, the installation 6 for producing activated irradiation targets, and for example the ICU 42, optionally comprises a controller 160 configured for controlling the following steps carried out by the installation 6:

passing a quantity $q_1$ of non-activated irradiation targets 16 from the irradiation target feed system 21 into the instrumentation tube system 12 using the target drive system 25;

exposing this quantity $q_1$ of non-activated irradiation targets 16 to neutron flux in the instrumentation tube system 12 for a predetermined irradiation duration $d_1$ so as to obtain a quantity $q_1$ of partially activated irradiation targets 16, the predetermined irradiation duration $d_1$ being strictly smaller than the minimum activation time for complete conversion of the precursor material contained in the irradiation targets 16 to a desired radionuclide;

passing the quantity $q_1$ of partially activated irradiation targets 16 from the instrumentation tube system 12 into the decay station 30 using the target drive system 25;

passing a quantity $q_2$ of non-activated irradiation targets 16 from the irradiation target feed system 21 into the instrumentation tube system 12 using the target drive system 25;

passing the quantity $q_1$ of partially activated irradiation targets 16 back from the decay station 30 into the instrumentation tube system 12 using the target drive system 25;

exposing the quantity $q_1$ of partially activated irradiation targets 16 and the quantity $q_2$ of non-activated irradiation targets 16 to neutron flux in the instrumentation tube system for a predetermined irradiation duration $d_2$, so as to obtain a quantity $q_1$ of partially activated or fully activated irradiation targets 16 and a quantity $q_2$ of partially activated irradiation targets 16; and discharging at least some, and more particularly the fully activated, irradiation targets 16 from the decay station 30 into the target storage container 34.

The above-described decay station 30 and installation 6 are advantageous.

Indeed, the decay station 30 allows for a transfer of a predetermined amount of irradiation targets 16 into the decay station 30, either for temporary storage of partially activated irradiation targets 16 prior to being transferred back into the core 10 of the nuclear reactor for further activation by means of the inlet distributor 68 or for the decay of the short-lived radioisotopes of the activation to an acceptable level prior to their discharge into storage containers 34.

The possibility of transferring a predetermined amount of irradiation targets 16 contained in the decay station 30 back into the core 10 offered by the decay station 30 allows for a production of batches of radioisotopes with a delivery interval which is smaller than the activation time of the radioisotopes in the core within one same instrumentation tube system 12. For example, it is possible to produce batches of radioisotopes with a delivery interval corresponding to half the activation time of the radioisotopes in the core.

In particular, the decay station 30 may receive, in this linear order, from the inlet to the outlet of the decay station, a batch of partly activated irradiation targets 16, having spent only a fraction of the required activation time in the core and a batch of fully activated irradiation targets, having spent the required activation time in the core 10. The inlet distributor 68 and associated inlet counter 96 then allow selectively transferring only the partly activated radioisotopes back into the core 10, while retaining the fully activated irradiation targets 16 in the decay station 30.

The decay station 30 also allows discharging the fully activated irradiation targets 16 into conventional storage containers 34 without need for a hot cell or for manipulators by providing for an intermediate storage of the fully activated irradiation targets 16 within the discharge circuit of the installation 6 for a duration sufficient for the activity of the short-lived radioisotopes to decrease to an acceptable level. Once the radioactivity level has decreased below a predetermined threshold, the activated irradiation targets 27 may automatically be transferred out of the decay station 30 and into the discharge system 27 of the installation 6. In addition, this decay station 30 may be integrated directly into existing radionuclide generation systems with little additional effort, while allowing for a safe decay of the short-lived highly radioactive by-product isotopes.

This decay station 30 therefore constitutes a cost effective and compact solution for discharging the activated irradiation targets 16 from the core 10 of the nuclear reactor, while minimizing the risk for the environment.

The method according to the present disclosure allows reducing the delivery interval of the radioisotopes contained in the fully activated irradiation targets 16. Indeed, at each moment in time, the instrumentation finger 14 contains at least two batches of irradiation targets 16 at different activation stages. The decay station 30 serves as an intermediate storage for a partially activated batch, while a new batch of non-activated targets 16 is introduced into the instrumentation finger 14. Once the new batch has been introduced into the instrumentation finger 14, the batch of partially activated irradiation targets 16 can be transferred back into the instrumentation finger 14 for further exposure to neutron flux. The particular structure of the decay station 30 with its inlet distributor 68 and associated inlet counter 96 makes it possible to transfer only one of the two batches of irradiation targets back into the instrumentation finger 14, while the other batch remains in the decay station 30 prior to being discharged into a corresponding discharge container, possibly after having been held in the decay station 30 for the decay time $d_3$ to allow for sufficient decay of the short-lived highly radiating isotopes.

According to a second embodiment, the method for producing activated irradiation targets 16 using the installation 6 described above comprises steps of:

- passing non-activated irradiation targets 16 into the instrumentation tube system 12 from the irradiation target feed system 21;
- exposing the irradiation targets 16 to neutron flux in the instrumentation tube system 12 for a predetermined irradiation duration corresponding to the minimum activation time required for complete conversion of the precursor material contained in the irradiation targets 16 to a desired radionuclide so as to obtain fully activated irradiation targets 16;
- passing the fully activated irradiation targets 16 from the instrumentation tube system 12 into the decay station 30;
- holding the fully activated irradiation targets 16 in the decay station 30 for a decay duration
- discharging the irradiation targets 16 from the decay station 30 into the target storage container 34.

The decay duration corresponds to the time required for the radiation, and in particular the dose rate, emitted by the quantity $q_1$ of fully activated irradiation targets 16 to fall below a predetermined threshold. According to one example, the decay duration is predetermined depending on the nature of the material contained in the irradiation targets 16. According to an alternative, the decay duration depends on the measurement of the radiation, and in particular the dose rate, by the outlet radiation detector 102 and/or by the optional intermediate radiation detectors 104.

Optionally, the method comprises a step of displacing the diverter 32 into the second configuration prior to passing the irradiation targets 16 from the irradiation target feed system 21 into the instrumentation tube system 12 and a step of displacing the diverter 32 from the second configuration into the first configuration prior to passing the irradiation targets 16 from the instrumentation tube system 12 into the decay station 30.

Preferably, the inlet counter 96 counts the number of irradiation targets 16 transferred from the instrumentation tube system 12 into the decay station 30.

The method according to this alternative results in the production of radionuclides with a delivery interval equal to the minimum activation time of the desired radionuclide augmented by the decay duration.

The method according to this alternative is advantageous. Indeed, it improves the safely and reduces radiation contamination to the environment and personnel, since the irradiation targets into the container 34 only after decay of the highly radioactive isotope by-products. In addition, it may be carried out automatically, and does not require the use of additional separate installations, such as hot cells. It is therefore easy to implement and requires only little space.

In the above description, the diverter 32 was described as part of an installation including a decay station 30. In this case, it is indirectly connected to the irradiation target discharge system 27 through the decay station 30. The diverter 32 may however also be part of an installation which does not include a decay station 30, and is then connected to the irradiation target discharge system 27 directly without a decay station 30 interposed there-between.

In addition, the diverter 32 has been described as connected to the instrumentation tube system 12 of a core of a nuclear reactor. However, the diverter 32 may be connected to other structures inside the core of a nuclear reactor than the instrumentation tube system 12, depending on the needs, with the same advantages.

The present application also relates to an installation for producing activated irradiation targets 16 in an instrumentation tube system 12 of a nuclear reactor, comprising:

- an irradiation target feed system 21 as described above, configured for providing non-activated irradiation targets 16;
- an instrumentation tube system 12 as described above, configured for receiving the irradiation targets 16 from the irradiation target feed system 21 in view of their activation through exposure to neutron flux in the nuclear reactor;
- an irradiation target discharge system 27 comprising a target exit port configured to be coupled to a target storage container 34,
- a diverter 32 as described above, configured to selectively define a path for the displacement of the irradiation targets 16 between the irradiation target feed system 21 and the instrumentation tube system 12 or between the instrumentation tube system 12 and the irradiation target discharge system 27, the first connector 150 being connected to the irradiation target discharge system 27, the second connector 152 being connected to the irradiation target feed system 21 and the third connector 154 being connected to the instrumentation tube system 12; and an irradiation target drive system 25, configured for transporting at least some of the irradiation targets 16 through the installation 6.

What is claimed is:

1. A decay station configured for receiving irradiation targets from a structure of a core of a nuclear reactor in a predetermined linear order, the decay station comprising:

a housing comprising a radiation shielding configured for shielding an environment of the decay station from radiation emitted by the irradiation targets contained in the decay station, the housing delimiting a decay conduit intended for containing the irradiation targets in the predetermined linear order, the decay conduit comprising:

a decay conduit inlet configured to be connected to the structure of the core of the nuclear reactor for receiving the irradiation targets therefrom, and a decay conduit outlet configured to be connected to an irradiation target discharge system for discharging the irradiation targets from the decay station;

an inlet distributor located at the decay conduit inlet and configured for releasing only a predetermined amount of the irradiation targets at a time from the decay station towards the structure of the core of the nuclear reactor, the inlet distributor being configured for releasing the irradiation targets closest to the decay conduit inlet, while retaining a remainder of the irradiation targets in the decay conduit;

an inlet counter configured for counting a number of the irradiation targets entering or exiting the decay conduit through the decay conduit inlet, the inlet counter being located at the decay conduit inlet; and an outlet radiation detector configured for measuring the radiation emitted by an irradiation target located at the decay conduit outlet;

the inlet distributor successively comprising, in a direction from the decay conduit inlet toward the decay conduit outlet:

a lock element displaceable between a locking position, in which the lock element blocks movement of the irradiation targets out of the decay conduit through the decay conduit inlet and a release position, in which the lock element allows the predetermined amount of the irradiation targets out of the decay conduit through the decay conduit inlet; and a retainer displaceable between a retracted position, in which the retainer allows passage of the irradiation targets, and an extended position, in which the retainer extends at least partially into the decay conduit, the retainer being configured for abutting against an irradiation target in the extended position so as to block the movement of the irradiation target towards the decay conduit inlet, the inlet distributor further comprising:

a first actuator configured for displacing the lock element between the locking position and the release position; and a second actuator configured for displacing the retainer between the extended position and the retracted position.

2. The decay station according to claim 1, further comprising a pressurized gas supply connected to the decay conduit outlet for introducing pressurized gas into the decay conduit from the decay conduit outlet.

3. The decay station according to claim 1, wherein the lock element comprises a lock pin configured to extend radially across the decay conduit in the locking position of the lock element and wherein the retainer comprises a retainer pin configured to extend radially partially into the decay conduit in the extended position of the retainer and a spring element connected to the retainer pin.

4. The decay station according to claim 2, further comprising a controller configured to control the release of the predetermined amount of irradiation targets by the inlet distributor by controlling a release sequence comprising the following succession of steps:

displacing the lock element from the release position into the locking position by means of the first actuator;

activating the pressurized gas supply so as to obtain a flow of pressurized gas through the decay conduit from an outlet end thereof, the flow of pressurized gas being configured for pushing the irradiation targets contained in the decay conduit toward an inlet end thereof until the irradiation targets abut against the lock element positioned in the locking position;

displacing the retainer by the second actuator from the retracted position into the extended position, in which the retainer is arranged to abut against an irradiation target contained in the decay conduit; and displacing the lock element from the locking position into the release position by the first actuator such that the predetermined amount of irradiation targets, corresponding to the irradiation targets located downstream of the retainer in the direction of pressurized gas flow are carried out of the decay conduit through the decay conduit inlet, while the remainder of the irradiation targets are retained in the decay conduit by means of the retainer positioned in the extended position.

5. The decay station according to claim 4, wherein the controller is further adapted for repeating the release sequence a number of times depending on a total amount of irradiation targets that are to be released from the decay station through the decay conduit inlet.

6. The decay station according to claim 1, wherein the predetermined amount of irradiation targets is equal to one irradiation target, the inlet distributor being configured for releasing the irradiation targets one by one from the decay station towards the structure of the core of the nuclear reactor.

7. The decay station according to claim 1, further comprising at least one intermediate irradiation target counter configured for counting the number of irradiation targets present in the decay conduit, and located between the inlet counter and the decay conduit outlet of the decay conduit.

8. The decay station according to claim 1, further comprising at least one intermediate radiation detector configured for measuring the radiation emitted by the irradiation targets contained in the decay conduit, and located between the outlet radiation detector and the decay conduit inlet.

9. The decay station according to claim 1, further comprising an outlet distributor, located at the decay conduit outlet and configured for releasing only a predetermined amount of irradiation targets at a time out of the decay station through the decay conduit outlet, the outlet distributor being configured for releasing the irradiation targets closest to the decay conduit outlet, while retaining the remainder of the irradiation targets in the decay conduit.

10. The decay station according to claim 1, wherein the decay conduit is a rectilinear conduit.

11. The decay station according to claim 1, wherein the decay conduit is substantially U-shaped and comprises a first decay conduit section, a second decay conduit section and a bottom formed at a conjunction between the first and second decay conduit sections, the first and second decay conduit sections extending upwards from the bottom.

12. The decay station according to claim 1, further comprising a controller configured for discharging at least some of the irradiation targets from the decay station after a predetermined decay duration and/or when the radiation measured by the outlet radiation detector has decreased below a predetermined threshold.

13. The decay station according to claim 1, wherein the structure of the core of the nuclear reactor is an instrumentation tube system of a nuclear reactor.

14. An installation for producing activated irradiation targets in an instrumentation tube system of a nuclear reactor, the installation comprising:

an irradiation target feed system configured for providing non-activated irradiation targets;

an instrumentation tube system configured for receiving the irradiation targets from the irradiation target feed system in view of activation of the irradiation targets through exposure to neutron flux in the nuclear reactor;

the decay station according to claim 1, the decay conduit inlet of the decay conduit being connected to the instrumentation tube system and the inlet distributor of the decay station being configured for releasing the predetermined amount of irradiation targets at a time from the decay station towards the instrumentation tube system, the inlet distributor being configured for releasing the irradiation targets closest to the instrumentation tube system, while retaining the remaining irradiation targets in the decay station;

an irradiation target discharge system comprising a target exit port configured to be coupled to a target storage container, the discharge system comprising an inlet end connected to the decay conduit outlet of the decay station;

a diverter displaceable between a first position, in which the diverter defines a path for the displacement of the irradiation targets between the irradiation target feed system and the instrumentation tube system, and a second position, in which the diverter defines a path for the displacement of the irradiation targets between the instrumentation tube system and the decay station; and an irradiation target drive system configured for transporting at least some of the irradiation targets through the installation, the irradiation target drive system including a pressurized gas supply of the decay station.

15. The installation according to claim 14, further comprising a controller configured for controlling the following steps carried out by the installation:

passing a quantity q1 of non-activated irradiation targets from the irradiation target feed system into the instrumentation tube system using the target drive system;

exposing the quantity q1 of non-activated irradiation targets to neutron flux in the instrumentation tube system for a predetermined irradiation duration d1 so as to obtain a quantity q1 of partially activated irradiation targets, the predetermined irradiation duration d1 being strictly smaller than a minimum activation time for complete conversion of a precursor material contained in the irradiation targets to a desired radionuclide;

passing the quantity q1 of partially activated irradiation targets from the instrumentation tube system into the decay station using the target drive system;

passing a quantity q2 of non-activated irradiation targets from the irradiation target feed system into the instrumentation tube system using the target drive system;

passing the quantity q1 of partially activated irradiation targets back from the decay station into the instrumentation tube system using the target drive system;

exposing the quantity q1 of partially activated irradiation targets and the quantity q2 of non-activated irradiation targets to neutron flux in the instrumentation tube system for a predetermined irradiation duration d2, so as to obtain a quantity q1 of partially activated or fully activated irradiation targets and a quantity q2 of partially activated irradiation targets; and discharging at least some irradiation targets from the decay station into the target storage container.

16. The installation according to claim 14, wherein the diverter comprises:

a first connector configured to be connected to the irradiation target discharge system;

a second connector configured to be connected to the irradiation target feed system;

a third connector configured to be connected to the structure of the core of the nuclear reactor;

diverter conduits, each diverter conduit being movable between:

a first position, in which the diverter conduit connects one of the first connector and the second connector to the third connector so as to define a path for the irradiation targets from the one of the first and the second connector to the third connector, and a second position, in which the diverter conduit does not connect the one of the first connector and the second connector to the third connector;

each diverter conduit being shaped in such a manner that the diverter conduit induces, along a length of the diverter conduit, two changes of direction of the irradiation targets configured to circulate therein; and an actuator configured for displacing each diverter conduit between the first position and the second position;

the at least one diverter conduit including a first diverter conduit and a second diverter conduit, the first diverter conduit connecting the first connector to the third connector in the first position of the first diverter conduit so as to define a path for the displacement of the irradiation targets from the first connector to the third connector, and the second diverter conduit connecting the second connector to the third connector in the first position of the second diverter conduit so as to define a path for the displacement of the irradiation targets from the second connector to the third connector.

17. A method for producing activated irradiation targets using the installation according to claim 14, the method comprising:

passing a quantity q1 non-activated irradiation targets into the instrumentation tube system from the irradiation target feed system;

exposing the quantity q1 of non-activated irradiation targets to neutron flux in the instrumentation tube system for a predetermined irradiation duration d1 so as to obtain a quantity q1 of partially activated irradiation targets, the predetermined irradiation duration d1 being equal to or smaller than a minimum activation time for complete conversion of a precursor material of the irradiation targets to a desired radionuclide; and passing the quantity q1 of irradiation targets from the instrumentation tube system into the decay station; and discharging at least some irradiation targets from the decay station into the target storage container.

18. The method according to claim 17, further comprising holding at least some of the irradiation targets in the decay station for a predetermined decay duration prior to discharging the irradiation targets from the decay station into the target storage container.

19. The method according to claim 17, wherein the predetermined duration d1 is smaller than the minimum activation time for complete conversion of the precursor material of the irradiation targets to a desired radionuclide such that the quantity q1 of irradiation targets obtained at the end of the exposing step and passed into the instrumentation tube system is a quantity q1 of partially activated irradiation targets;

wherein the method further comprises the following steps, between the steps of passing the quantity q1 of partially activated irradiation targets from the instrumentation tube system into the decay station and of discharging at least some irradiation targets from the decay station into the target storage container:

passing a quantity q2 of non-activated irradiation targets into the instrumentation tube system;

passing the quantity q1 of partially activated irradiation targets back from the decay station into the instrumentation tube system; and exposing the quantity q1 of partially activated irradiation targets and the quantity q2 of non-activated irradiation targets to neutron flux in the instrumentation tube system for a predetermined irradiation duration d2, so as to obtain a quantity q1 of partially activated or fully activated irradiation targets and a quantity q2 of partially activated irradiation targets.

* * * * *